(12) United States Patent
Kim et al.

(10) Patent No.: US 11,261,783 B2
(45) Date of Patent: Mar. 1, 2022

(54) COMBINED POWER GENERATION SYSTEM EMPLOYING PRESSURE DIFFERENCE POWER GENERATION

(71) Applicant: DOOSAN HEAVY INDUSTRIES & CONSTRUCTION CO., LTD., Changwon-si (KR)

(72) Inventors: Sanghyeun Kim, Yongin-si (KR); Hwachang Sung, Seoul (KR); Juntae Jang, Seoul (KR); Songhun Cha, Osan-si (KR)

( * ) Notice: Subject to any disclaimer, the term of this patent is extended or adjusted under 35 U.S.C. 154(b) by 352 days.

(21) Appl. No.: 16/143,401

(22) Filed: Sep. 26, 2018

(65) Prior Publication Data

US 2019/0128184 A1 May 2, 2019

(30) Foreign Application Priority Data

Oct. 30, 2017 (KR) .......... 10-2017-0142783
Nov. 17, 2017 (KR) .......... 10-2017-0153899

(51) Int. Cl.
*F02C 6/00* (2006.01)
*F02C 6/10* (2006.01)
(Continued)

(52) U.S. Cl.
CPC .............. *F02C 6/00* (2013.01); *F01D 15/10* (2013.01); *F01K 23/10* (2013.01); *F02C 6/08* (2013.01);
(Continued)

(58) Field of Classification Search
CPC ........ F01K 23/10; F01K 21/047; F01K 21/04; F01K 17/04; F01K 17/025; F02C 7/224;
(Continued)

(56) References Cited

U.S. PATENT DOCUMENTS 5,255,505 A * 10/1993 Cloyd ............... F02C 7/185
60/806
6,167,692 B1 * 1/2001 Anand .............. F02C 1/00
60/39.12
(Continued)

FOREIGN PATENT DOCUMENTS

CN 1671956 A 9/2005
JP H07-217800 A 8/1995
(Continued)

OTHER PUBLICATIONS

A Korean Office Action dated Jan. 14, 2019 in connection with Korean Patent Application No. 10-2017-0142783 which corresponds to the above-referenced U.S. application.
(Continued)

*Primary Examiner* — Todd E Manahan
*Assistant Examiner* — Sean V Meiller
(74) *Attorney, Agent, or Firm* — Harvest IP Law, LLP

(57) ABSTRACT

A combined power generation system improves the generation efficiency of a pressure difference power generation facility by using at least one of air for cooling a turbine of a gas turbine power generation facility and waste heat of flue gas generated by the gas turbine power generation facility. Working fluid to be used in a supercritical fluid power generation facility is cooled by using cold energy of liquefied natural gas. The system includes an air discharge channel via which compressed air is discharged; a fuel gas heater for heating the natural gas to be introduced into the pressure difference power generation facility by performing a heat exchange between the discharged air and the natural gas being heated; and a cooling air inflow channel for guiding the cooled air passed through the fuel gas heater to a turbine of the gas turbine power generation facility.

5 Claims, 22 Drawing Sheets

(51) Int. Cl.
  *F01K 23/10* (2006.01)
  *F01D 15/10* (2006.01)
  *F02C 6/08* (2006.01)
  *F02C 6/18* (2006.01)
  *F17C 1/00* (2006.01)
  *F02C 7/141* (2006.01)
  *F02C 7/18* (2006.01)

(52) U.S. Cl.
  CPC .................. *F02C 6/10* (2013.01); *F02C 6/18* (2013.01); *F02C 7/141* (2013.01); *F02C 7/185* (2013.01); *F17C 1/002* (2013.01); *F05D 2220/32* (2013.01); *F05D 2220/74* (2013.01); *F05D 2220/76* (2013.01); *F17C 2221/033* (2013.01); *F17C 2270/0102* (2013.01)

(58) Field of Classification Search
  CPC .. F02C 7/141; F02C 7/185; F02C 6/18; F02C 6/10; F02C 6/04; F02C 3/28; F02C 3/24; F02C 3/22; F05D 2220/72
  See application file for complete search history.

(56) References Cited

U.S. PATENT DOCUMENTS

| | | | | |
|---|---|---|---|---|
| 6,374,591 | B1* | 4/2002 | Johnson | .................. F01K 23/10 |
| | | | | 60/783 |
| 8,951,316 | B2* | 2/2015 | Abraham | .................. C10J 3/52 |
| | | | | 423/644 |
| 2005/0241320 | A1 | 11/2005 | Blonn et al. | |
| 2011/0042968 | A1* | 2/2011 | Tronstad | .................. F02C 6/18 |
| | | | | 290/1 R |

FOREIGN PATENT DOCUMENTS

| | | | |
|---|---|---|---|
| JP | H09-138063 | A | 5/1997 |
| JP | H10-288047 | A | 10/1998 |
| JP | 2001-081484 | A | 3/2001 |
| JP | 2001-123851 | A | 5/2001 |
| JP | 2001123851 | A * | 5/2001 |
| JP | 2011-032954 | A | 2/2011 |
| JP | 2011032954 | A * | 2/2011 |
| JP | 4884527 | B2 | 2/2012 |
| JP | 2013-194598 | A | 9/2013 |
| JP | 2017-190829 | A | 10/2017 |
| KR | 10-2011-0047905 | A | 5/2011 |
| KR | 10-2017-0034719 | A | 3/2017 |
| WO | 2008/150450 | A1 | 12/2008 |

OTHER PUBLICATIONS

A Korean Office Action dated Jan. 28, 2019 in connection with Korean Patent Application No. 10-2017-0153899 which corresponds to the above-referenced U.S. application.

A Korean Office Action dated Jun. 26, 2019 in connection with Korean Patent Application No. 10-2017-0153899 which corresponds to the above-referenced U.S. application.

* cited by examiner

COMBINED POWER GENERATION SYSTEM EMPLOYING PRESSURE DIFFERENCE POWER GENERATION

CROSS REFERENCE TO RELATED APPLICATIONS

This application claims priority to Korean Patent Application No(s). 10-2017-0142783 and 10-2017-0153899 filed on Oct. 30, 2017 and Nov. 17, 2017 respectively, the disclosures of which are incorporated herein by reference in their entirety.

BACKGROUND OF THE INVENTION

1. Field of the Invention

The present invention relates to a combined power generation system capable of increasing efficiency of pressure difference power generation by using either turbine cooling air or waste heat of flue gas of a gas turbine power generation facility or using both of the turbine cooling air and the waste heat of the flue gas.

2. Description of the Background Art

Natural gas (NG) is a collective term for naturally occurring gases including hydrocarbon gases and non-hydrocarbon gases. Natural gas occurs underground and is present as a gas when it comes out of the ground. Natural gas primarily consists of methane ($CH_4$) which accounts for about 80 to 90% according to the place of production, and additionally some flammable compounds such as ethane ($C_2H_6$) and propane ($C_3H_8$) which account for the rest. Liquefied natural gas (LNG) refers to natural gas artificially liquefied at low temperatures of about −160° C.

Natural gas and oil are extracted from oilfields or gas fields. For facilitating the extraction of natural gas from oilfields or gas fields, fracturing (also called fracking) fluid such as steam, groundwater, seawater, and carbon dioxide is injected into a well bore. The natural gas extracted from an oil or gas field is delivered as liquefied natural gas (LNG) to consumers. LNG delivered to consumers needs to be regasified for use in customer places or for distribution.

Seawater may be used for LNG regasification. However, the use of seawater for LNG regasification could have an unexpected impact on marine ecosystems. Alternatively, for LNG regasification, natural gas may be burned to generate heat which is used as energy for LNG regasification. This regasification method has a disadvantage of energy waste.

Natural gas is often used as fuel in power generation facilities where the natural gas is required to be controlled at an appropriate temperature and pressure. To this end, a pressure reducing valve has been used to control the pressure of natural gas flowing into such a power generation facility. In the process of reducing the pressure of the natural gas, a problem of energy loss occurs.

SUMMARY OF THE INVENTION

Accordingly, the present invention has been made in view of the problems occurring in the related art and an objective of the present invention is to provide a combined power generation system capable of increasing the generation efficiency of a pressure difference power generation facility using one or both of the turbine cooling air of a gas turbine power generation facility and waste heat of flue gas generated by the gas turbine power generation facility.

According to one aspect of the present invention, a combined power generation system may include a pressure difference power generation facility, a gas turbine power generation facility, an air discharge channel, a fuel gas heater, and a cooling air inflow channel. The pressure difference power generation facility may generate power (e.g., electricity) using a change in pressure of natural gas. The gas turbine power generation facility may include a compressor that takes in and compresses external air to produce compressed air, a combustor that mixes the compressed air and natural gas passing through the pressure difference power generation facility and burns the resulting fuel-and-gas mixture to produce a flue gas, a turbine having a turbine rotor configured to be rotated by the flue gas, and a generator configured to be powered by the turbine. The air discharge channel may be configured to discharge a portion of the compressed air produced by the compressor of the gas turbine power generation facility. The fuel gas heater may be configured to heat the natural gas in a manner of causing heat exchange between the natural gas to flow into the pressure difference power generation facility and air that flows along the air discharge channel. The cooling air inflow channel may be configured to supply the air passing through the fuel gas heater to the turbine of the gas turbine power generation facility.

The air discharge channel may include a branch channel connected to the cooling air inflow channel without involving the fuel gas heater and an air flow control valve for regulating the flow rate of air flowing into the fuel gas heater.

The combined power generation system may further include a cooling fan disposed in the cooling air inflow channel.

The combined power generation system may further include a supercritical fluid power generation facility, a waste heat recovery heat exchange facility, and an LNG heat exchange facility. The supercritical fluid power generation facility may generate power (e.g., electricity) using a supercritical working fluid heated by the flue gas generated by the gas turbine power generation facility. In the waste heat recovery heat exchange facility, heat exchange may occur between the flue gas generated by the gas turbine power generation facility and working fluid for use in the supercritical fluid power generation facility. In the LNG heat exchange facility, heat exchange may occur between the working fluid discharged from the supercritical fluid power generation facility and liquefied natural gas (LNG). Through this heat exchange, the working fluid is cooled and the liquefied natural gas is heated to be regasified into natural gas. The working fluid cooled through the heat exchange performed in the LNG heat exchange facility may be heated back because the working fluid passes through the waste heat recovery heat exchange facility, and then the heated working fluid may flow into the supercritical fluid power generation facility.

The combined power generation system may further include an NG temperature measurement unit for measuring the temperature of the natural gas flowing into the pressure difference power generation facility from the fuel gas heater; a working fluid heat exchanger in which heat exchange occurs between the working fluid which has undergone heat exchange in the LNG heat exchange facility and a portion of the working fluid discharged from the supercritical fluid power generation facility; and an air heat exchanger in which heat exchange occurs between the working fluid passing through the LNG heat exchange facility and the air that flows along the cooling air inflow channel.

The LNG heat exchange facility may further include a mediation fluid circulation unit in which heat exchange occurs between liquefied natural gas and working fluid; and a buffering unit configured to prevent explosions attributable to the mediation fluid.

The combined power generation system may further include an LNG storage facility for storing the liquefied natural gas to be supplied to the LNG heat exchange facility.

The combined power generation system may further include a supercritical fluid power generation facility, an LNG heat exchange facility, a first waste heat recovery heat exchange facility, and a second waste heat recovery heat exchange facility. The supercritical fluid power generation facility may generate power (e.g., electricity) using a supercritical working fluid heated by the flue gas generated by the gas turbine power generation facility. In the LNG heat exchange facility, heat exchange may occur between working fluid discharged from the supercritical fluid power generation facility and liquefied natural gas, so that the working fluid is cooled and the liquefied natural gas is heated to be regasified into natural gas. In the first waste heat recovery heat exchange facility, heat exchange may occur between the working fluid passing through the LNG heat exchange facility and then flowing into a first flow channel and the flue gas generated by the gas turbine power generation facility. In the second waste heat recovery heat exchange facility, heat exchange may occur between the flue gas generated by the gas turbine power generation facility and a merged stream of working fluid having passed through the LNG heat exchange facility and then flowing into a second flow channel and working fluid passing through the first waste heat recovery heat exchange facility. A portion of natural gas resulting from the regasification performed in the LNG heat exchange facility may be supplied to the fuel gas heater.

The combined power generation system may further include an air heat exchanger in which heat exchange occurs between working fluid passing through the LNG heat exchange facility and air that flows along the cooling air inflow channel. The working fluid passing through the air heat exchanger flows into the first flow channel or the second flow channel.

According to another aspect of the present invention, a combined power generation system may include a pressure difference power generation facility, a gas turbine power generation facility, a supercritical fluid power generation facility, a waste heat recovery heat exchange facility, a fuel gas heater, and an LNG heat exchange facility. The pressure difference power generation facility may generate power (e.g., electricity) using a change in pressure of the natural gas. The gas turbine power generation facility may generate power (e.g., electricity) using natural gas passing through the pressure difference power generation facility. The supercritical fluid power generation facility may generate power (e.g., electricity) using a supercritical working fluid heated by flue gas generated by the gas turbine power generation facility. In the waste heat recovery heat exchange facility, heat exchange may occur between the flue gas generated by the gas turbine power generation facility and working fluid for use in the supercritical fluid power generation facility. In the fuel gas heater, heat exchange may occur between natural gas to flow into the pressure difference power generation facility and working fluid discharged from the supercritical fluid power generation facility, thereby heating the natural gas to flow into the pressure difference power generation facility. In the LNG heat exchange facility, heat exchange may occur between the working fluid passing through the fuel gas heater and liquefied natural gas so that the liquefied natural gas is regasified into natural gas and the working fluid is cooled. A portion of the natural gas that results from the regasification performed in the LNG heat exchange facility may be supplied to the fuel gas heater, and the working fluid that is cooled in the LNG heat exchange facility may be supplied to the waste heat recovery heat exchange facility so as to be heated and then to be introduced into the supercritical fluid power generation facility.

A portion of the working fluid discharged from the supercritical fluid power generation facility may be introduced into the fuel gas heater, and another portion of the working fluid may be introduced into the LNG heat exchange facility. The combined power generation system may further include an NG temperature measurement unit and an eleventh valve. The NG temperature measurement unit may measure the temperature of the natural gas flowing into the pressure difference power generation facility from the fuel gas heater. The eleventh valve may regulate the flow rate of the working fluid flowing into the fuel gas heater according to the temperature of the natural gas measured by the NG temperature measurement unit. Here, the combined power generation system may further include a working fluid heat exchanger in which heat exchange occurs between the working fluid which has undergone heat exchange in the LNG heat exchange facility and a portion of the working fluid discharged from the supercritical fluid power generation facility.

The combined power generation system may further include an NG bypass flow channel configured such that the natural gas directly flows into the gas turbine power generation facility while bypassing the pressure difference power generation facility. A pressure reducing valve for reducing the pressure of natural gas may be installed on the NG bypass flow channel.

According to still another aspect of the present invention, a combined power generation system may include a pressure difference power generation facility, a gas turbine power generation facility, a supercritical fluid power generation facility, a fuel gas heater, an LNG heat exchange facility, a first waste heat recovery heat exchange facility, and a second waste heat recovery heat exchange facility. The pressure difference power generation facility may generate power (e.g., electricity) using a change in pressure of natural gas. The gas turbine power generation facility may generate power (e.g., electricity) using the natural gas passing through the pressure difference power generation facility. The supercritical fluid power generation facility may generate power (e.g., electricity) using a supercritical working fluid heated by flue gas generated by the gas turbine power generation facility. In the fuel gas heater, heat exchange may occur between the natural gas to flow into the pressure difference power generation facility and the working fluid which is discharged from the supercritical fluid power generation facility and is then introduced into an eleventh flow channel, so that the natural gas entering the pressure difference power generation facility is heated. In the LNG heat exchange facility, heat exchange may occur between the working fluid passing through the fuel gas heater and flowing into a twelfth flow channel and the liquefied natural gas. Through this heat exchange, the liquefied natural gas is regasified to natural gas and the working fluid is cooled. In the first waste heat recovery heat exchange facility, heat exchange may occur between the working fluid having passed through the LNG heat exchange facility and flowing into a thirteenth flow channel and the flue gas produced by the gas turbine power generation facility. In the second waste heat recovery heat exchange facility, a merged stream of the working fluid having passed through the LNG heat exchange facility and flowing into a fourteenth flow channel and the working fluid passing through the first waste heat recovery heat exchange facility may exchange heat with the flue gas produced by the gas turbine power generation facility. A portion of the natural gas that results from the regasification performed in the LNG heat exchange facility may be supplied to the fuel gas heater, and the working fluid passing through the second waste heat recovery heat exchange facility may flow into the supercritical fluid power generation facility.

According to exemplary embodiments of the present invention, it is possible to increase the generation efficiency of the pressure difference power generation facility by using turbine cooling air and waste heat of flue gas of a gas turbine power generation facility and to increase generation efficiency of the supercritical fluid power generation facility by using cold energy of the liquefied natural gas.

DETAILED DESCRIPTION OF THE DISCLOSURE

Figure 1A:
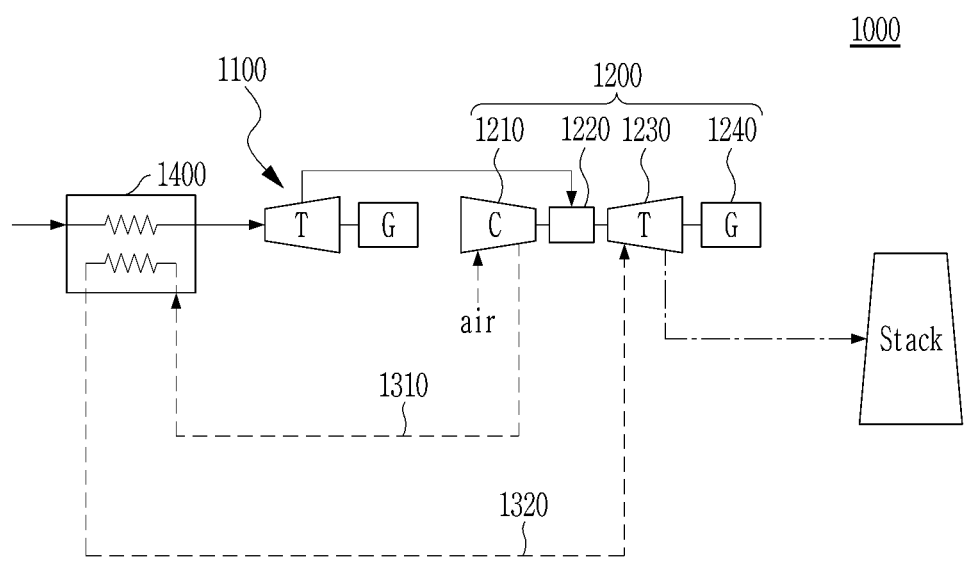
FIG. 1A is a block diagram of a combined power generation system performing pressure difference power generation, according to one embodiment of the invention.

The present invention may be embodied in many forms and have various embodiments. Thus, specific embodiments will be presented and described in detail below. While specific embodiments of the invention will be described herein below, they are only illustrative purposes and should not be construed as limiting to the invention. So, the invention should be construed to cover not only the specific embodiments but also cover other embodiments and modifications and equivalents to the specific embodiments and other possible embodiments.

The terminology used herein is for the purpose of describing particular embodiments only and is not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Hereinbelow, preferred embodiments of the invention will be described in detail with reference to the accompanying drawings. Throughout the drawings, elements having the same or substantially the same function are denoted by the same reference characters. In describing embodiments of the present disclosure, well-known functions or constructions will not be described in detail when it is determined that they may obscure the spirit of the present disclosure. Further, components not related to description of the present invention are not illustrated in the drawings and like reference numerals are given to like components.

Figure 1B:
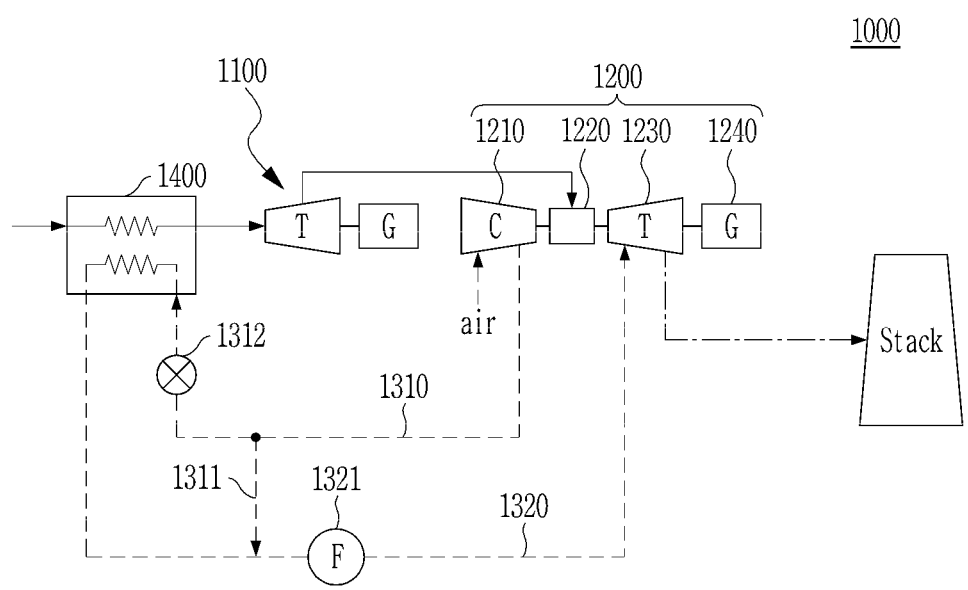
FIG. 1B is a block diagram of a combined power generation system performing pressure difference power generation according to one embodiment of the invention, the system including a branch channel and an air discharge channel on which an air flow control valve is installed.

FIG. 1A shows a combined power generation system performing pressure difference power generation, and FIG. 1B shows the system including a branch flow channel and an air discharge channel on which an air flow control valve is installed.

As illustrated in FIG. 1A, according to one embodiment of the present invention, a combined power generation system 1000 performs pressure difference power generation.

The combined power generation system 1000 includes a pressure difference power generation facility 1100, a gas turbine power generation facility 1200, an air discharge channel 1310, a fuel gas heater 1400, and a cooling air inflow channel 1320. The pressure difference power generation facility 1100 may generate electricity (or other power) using a change in pressure of natural gas (NG). The pressure difference power generation facility 1100 may include a turbine that rotates according to a decrease in the pressure of the natural gas and a generator connected to the turbine and generating electricity according to the rotation of the turbine.

The gas turbine power generation facility 1200 may generate electricity by burning fuel. The gas turbine power generation facility 1200 includes a compressor 1210, a combustor 1220, a turbine 1230, and a generator 1240. The compressor 1210 takes in and compresses external air to produce compressed air, and sends the compressed air to the combustor 1220. In the compressor 1210, the compressed air enters a high pressure and high temperature state. The combustor 1220 mixes the compressed supplied from the compressor 1210 and fuel and burns the resulting fuel-and-air mixture. The fuel may be natural gas passing through the pressure difference power generation facility 1100. Flue gas generated due to combustion is discharged to the turbine 1230. Turbine blades of the turbine 1230 are rotated by combustion gas, thereby causing the generator 1240 to generate electricity.

Either of the pressure difference power generation facility 1100 and the gas turbine power generation facility 1200 may generate power other than electrical power. That is, the pressure difference power generation facility 1100 and the gas turbine power generation facility 1200 may generate any power derived from the mechanical force generated by their corresponding turbines.

The air discharge channel 1310 is a path along which a portion of the compressed air discharged from the compressor 1210 of the gas turbine power generation facility 1200 flows. The air that flows along the air discharge channel 1310 has a temperature higher than that of air in atmospheric pressure.

In the fuel gas heater 1400, the air passing through the air discharge channel 1310 exchanges heat with natural gas which to flow into the pressure difference power generation facility 1100. The natural gas is heated to a high temperature through the heat exchange and is then introduced into the pressure difference power generation facility 1100. Meanwhile, the air is cooled through the heat exchange.

The air passing through the fuel gas heater 1400 moves along the cooling air inflow channel 1320. The cooled air discharged from the fuel gas heater 1400 flows into the turbine 1230 of the gas turbine power generation facility 1200 and is used as cooling air for cooling the turbine 1230.

Natural gas used as fuel passes through the fuel gas heater 1400. In the fuel gas heater 1400, the natural gas exchanges heat with the air passing through the air discharge channel 1310. Through this heat exchange, the temperature of the natural gas rises and the temperature of the air drops.

The natural gas passing through the fuel gas heater 1400 flows into the pressure difference power generation facility 1100. The pressure difference power generation facility 1100 generates electricity using a change in pressure of the natural gas. When the natural gas is flowing through the fuel gas heater 1400, the temperature of the natural gas rises. Therefore, the output power of the pressure difference power generation facility 1100 increases.

The natural gas passing through the pressure difference power generation facility 1100 flows into the combustor 1220 of the gas turbine power generation facility 1200. The compressor 1210 of the gas turbine power generation facility 1200 compresses air and sends the resulting compressed air to the combustor 1220. In the combustor 1220, the natural gas and the compressed air are mixed and burned.

A portion of the compressed air produced by the compressor 1210 flows into the fuel gas heater 1400 via the air discharge channel 1310. The cooled air discharged from the fuel gas heater 1400 flows into the turbine 1230 via the cooling air inflow channel 1320, thereby cooling the turbine 1230. Since the air discharged from the compressor 1210 of the gas turbine power generation facility 1200 flows into the turbine 1230 after being cooled through the heat exchange performed in the fuel gas heater 1400, the effect of cooling the turbine 1230 is improved as compared with a case where the compressed air directly flows into the turbine 1230 after being discharged from the compressor 1210 of the gas turbine power generation facility 1200.

According to another embodiment of the present invention, as illustrated in FIG. 1B, the air discharge channel 1310 includes a branch channel 1311 and an air flow control valve 1312.

The branch channel 1311 connects the air discharge channel 1310 with the cooling air inflow channel 1320 to allow the air to bypass the fuel gas heater 1400. The air flow control valve 1312 regulates the flow rate of air flowing into the fuel gas heater 1400. When the air flow control valve 1312 is controlled to lower the flow rate of the air flowing into the fuel gas heater 1400, the flow rate of the air flowing into the cooling air inflow channel via the branch channel 1311 increases. In one embodiment, the air flow control valve 1312 may be controlled such that the flow rate of the air flowing into the fuel gas heater 1400 becomes zero.

In the embodiment, a cooling fan 1321 may be installed on the cooling air inflow channel 1320. The cooling fan 1321 is disposed closer to the turbine 1230 of the gas turbine power generation facility 1200 than a junction point of the cooling air inflow channel 1320 and the branch channel 1311. There may be a probability that air is not sufficiently cooled in the fuel gas heater 1400 because the temperature of the compressed air discharged from the compressor 1210 is significantly high. In this case, the cooling fan 1321 functions to cool the air flowing into the turbine 1230 of the gas turbine power generation facility 1200, thereby increasing air cooling efficiency.

Figure 2A:
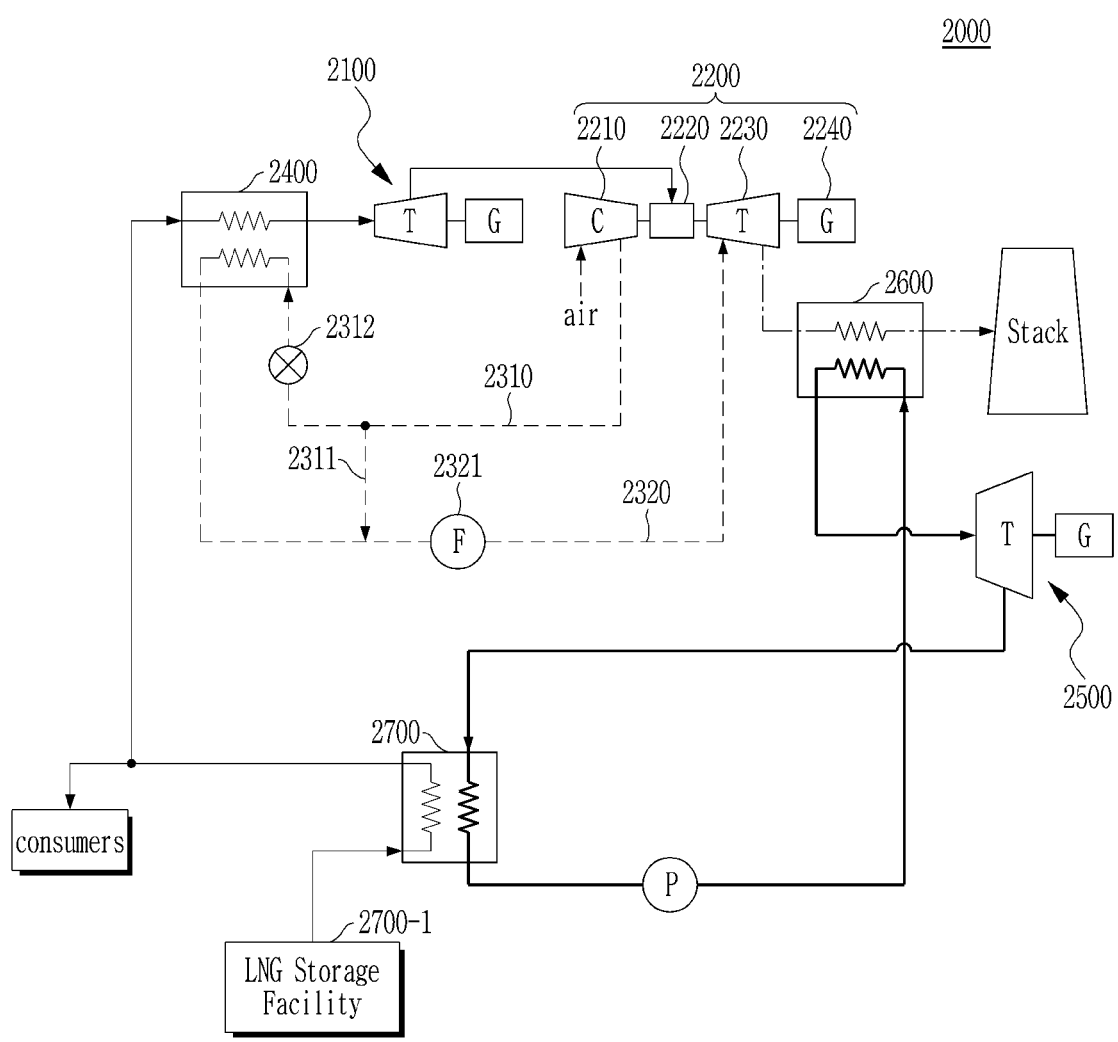
FIG. 2A is a block diagram of a combined power generation system performing pressure difference power generation according to one embodiment of the invention, the system including a supercritical fluid power generation facility.
Figure 2B:
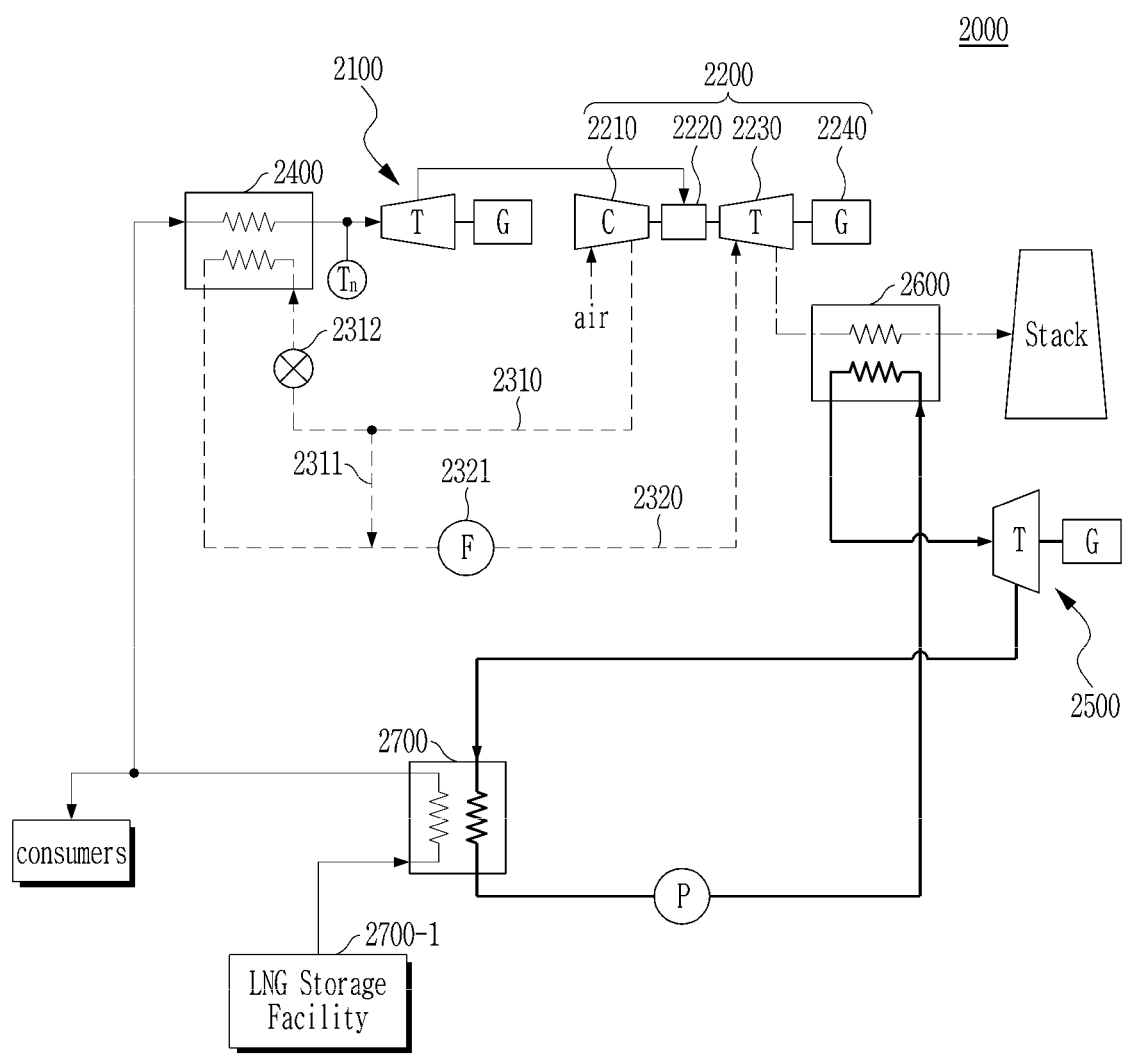
FIG. 2B is a block diagram of a combined power generation system performing pressure difference power generation according to one embodiment of the invention, the system including an NG temperature measurement unit.
Figure 2C:
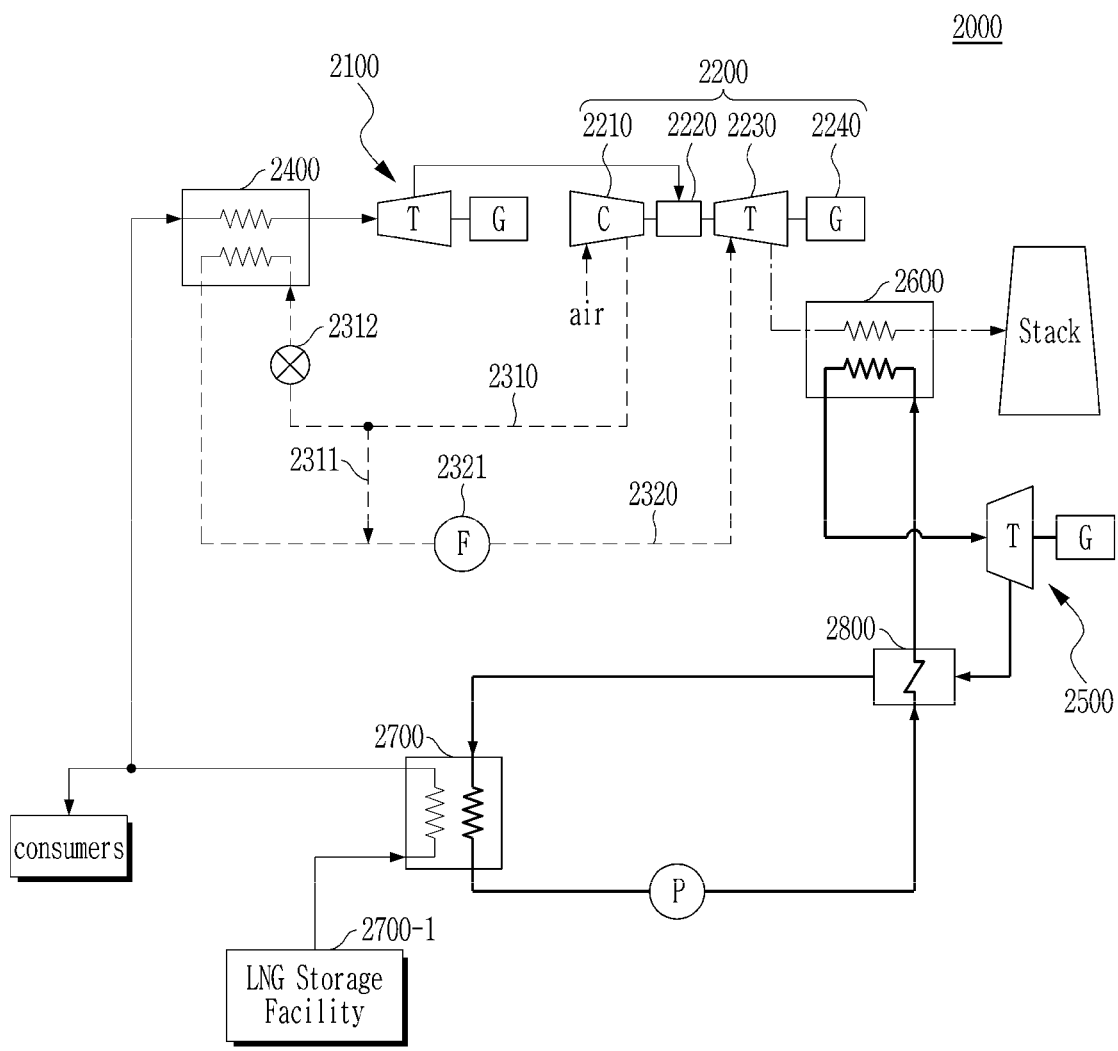
FIG. 2C is a block diagram of a combined power generation system performing pressure difference power generation according to one embodiment of the invention, the system including a working fluid heat exchanger.
Figure 2D:
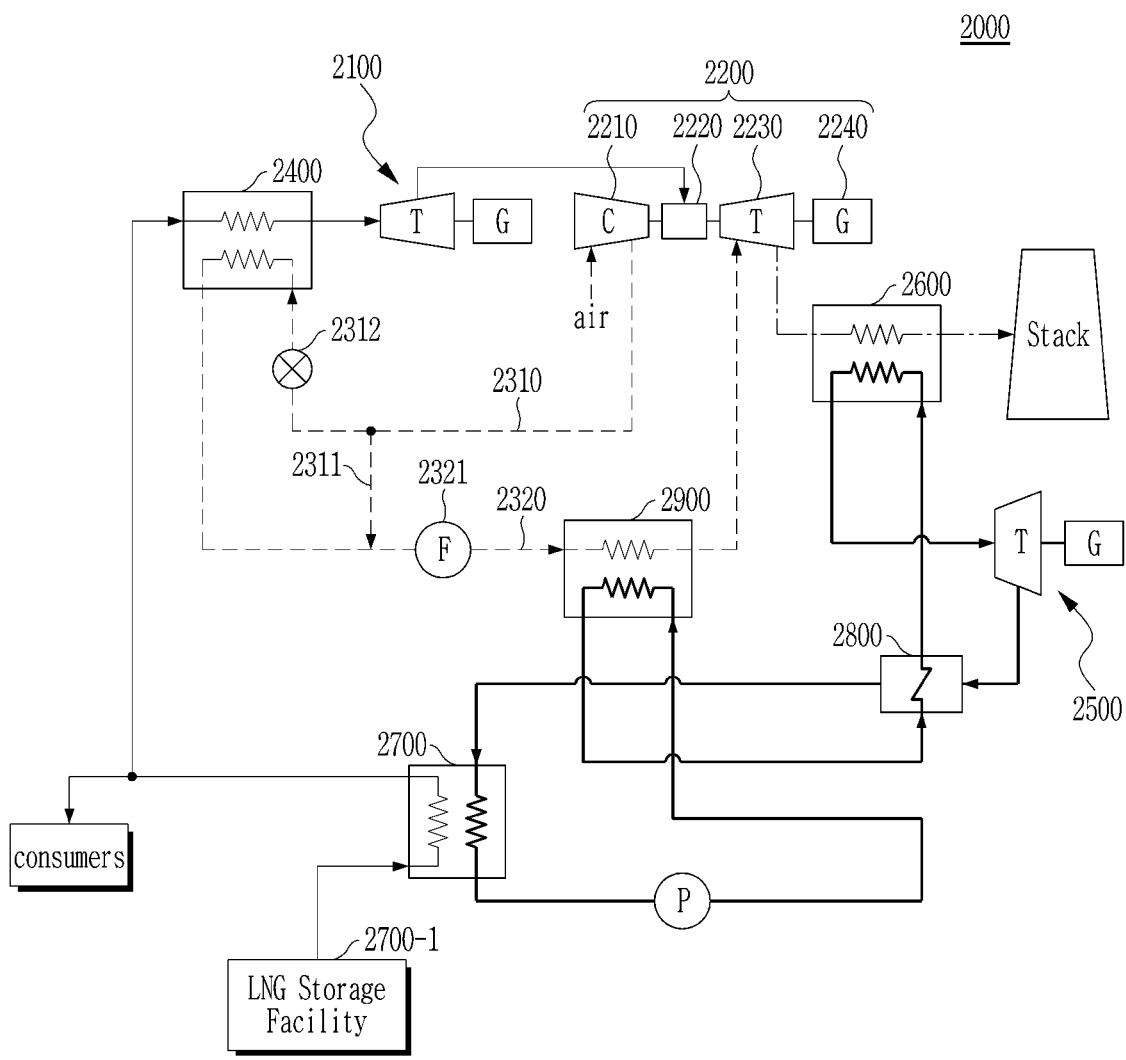
FIG. 2D is a block diagram of a combined power generation system performing pressure difference power generation according to one embodiment of the invention, the system including an air heat exchanger.
Figure 2E:
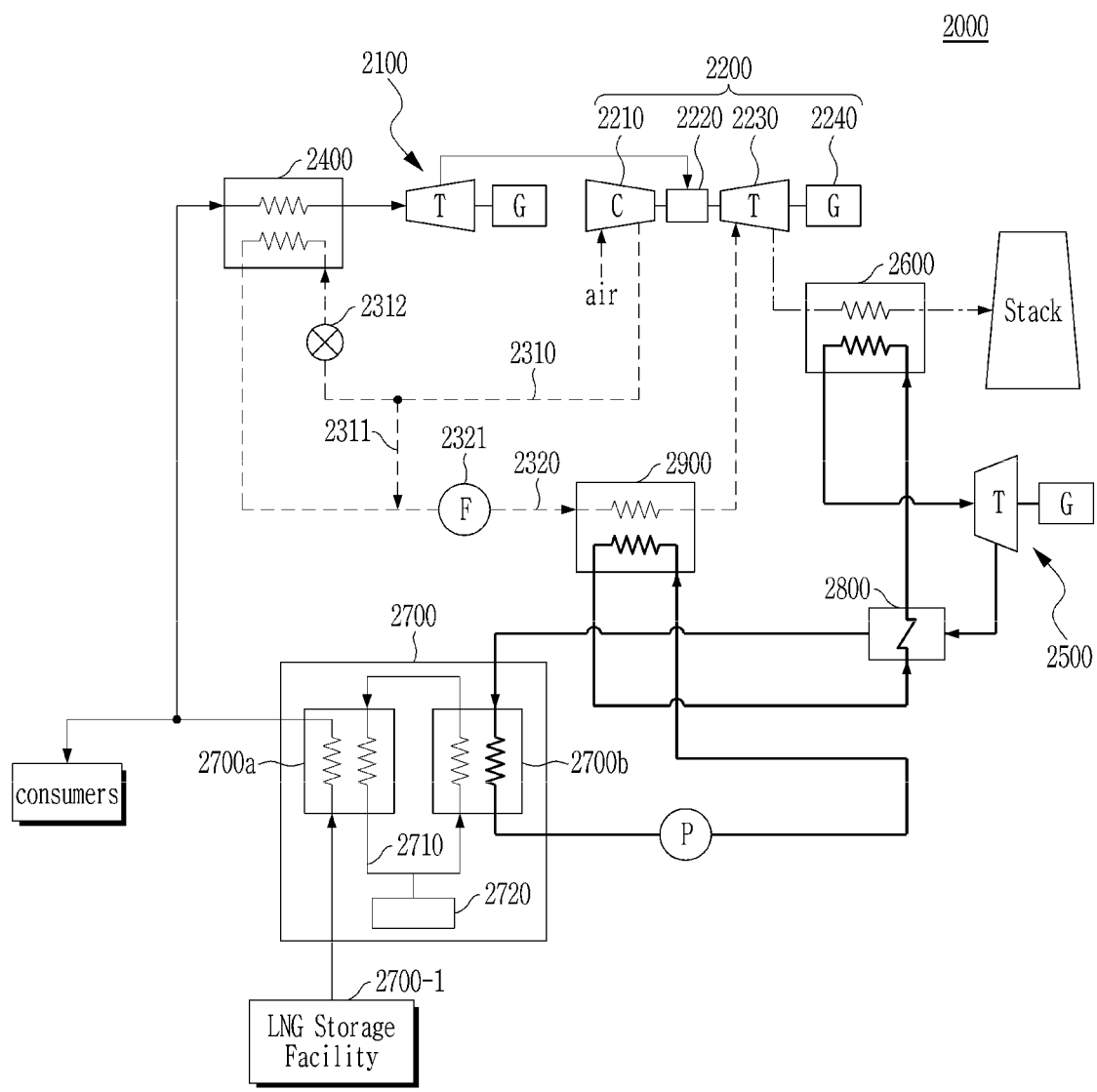
FIG. 2E is a block diagram of a combined power generation system performing pressure difference power generation according to one embodiment of the invention, the system including an LNG heat exchange facility having a mediation fluid circulation unit.

FIGS. 2A to 2E each show a combined power generation system performing pressure difference power generation according to one embodiment of the invention, with the system of including a supercritical fluid power generation facility, the system of FIG. 2B including an NG temperature measurement unit, the system of FIG. 2C including a working fluid heat exchanger, the system of FIG. 2D including an air heat exchanger, and the system of FIG. 2E including an LNG heat exchange facility having a mediation fluid circulation unit.

As illustrated in FIG. 2A, according to one embodiment of the present invention, a combined power generation system 2000 may generate electricity (or other power) using a pressure difference. The combined power generation system 2000 includes a pressure difference power generation facility 2100, a gas turbine power generation facility 2200, an air discharge channel 2310, a fuel gas heater 2400, a cooling air inflow channel 2320, a supercritical fluid power generation facility 2500, a waste heat recovery heat exchange facility 2600, and an LNG heat exchange facility 2700. Among the components of the systems illustrated FIGS. 2A to 2E, the same components as those in FIGS. 1A and 1B will not be described in detail.

The supercritical fluid power generation facility 2500 may generate electricity using a supercritical working fluid heated by a flue gas discharged from the gas turbine power generation facility 2200. The supercritical fluid power generation facility 2500 has a closed cycle in which the working fluid used for power generation is not discharged out of the system. Examples of the working fluid include supercritical carbon dioxide, supercritical nitrogen, supercritical argon, and supercritical helium. The working fluid is heated to enter a super critical state of high pressure and high temperature by passing through the waste heat recovery heat exchange facility 2600, and the "working fluid in the supercritical state" (hereinafter referred to as supercritical working fluid) drives the turbine. The turbine is connected to a generator which is driven by the turbine to generate power (e.g., electricity).

The flue gas discharged from the gas turbine power generation facility 1200 flows into and passes through the waste heat recovery heat exchange facility 2600. The flue gas exchanges heat with the working fluid for use in the supercritical fluid power generation facility 2500. Through this heat exchange, the working fluid to be used in the supercritical fluid power generation facility 2500 is heated to a high temperature.

In the LNG heat exchange facility 2700, heat exchange occurs between the working fluid discharged from the supercritical fluid power generation facility 2500 and liquefied natural gas (LNG). In general, natural gas is extracted from an oil field or a gas field and is then liquefied to become liquefied natural gas (LNG) for easy transport of the natural gas. The LNG is transported by a transportation means such as an LNG carrier and then stored in an LNG storage facility 2700-1. The LNG stored in the LNG storage facility 2700-1 is introduced into the LNG heat exchange facility 2700 to undergo heat exchange with the working fluid, thereby being regasified to become natural gas. In a case where LNG is regasified into natural gas in this way, additional energy source is not required for the regasification.

The LNG storage facility 2700-1 stores liquefied natural gas (LNG). The LNG storage facility 2700-1 may be a storage tank installed on the land or a floating storage facility installed on sea water. In one embodiment, the LNG storage facility 2700-1 may be an LNG carrier. In another embodiment, the LNG storage facility 2700-1 may be a floating, storage, and regasification unit (FSRU).

The natural gas that results from the regasification may be supplied to consumers and used in user places as fuel for driving various devices. In the present embodiment, a portion of the natural gas is introduced into the pressure difference power generation facility 2400. In the fuel gas heater 2400, the natural gas exchanges heat with the air discharged from the compressor 2210, so that the temperature of the natural gas rises. The air discharge channel 2310 through which the air discharged from the compressor 2210 flows, the branch channel 2311, the cooling air inflow channel 2320, the air flow control valve 2312, and the cooling fan 2321 are installed in the same manner as described with reference to FIG. 1B.

The natural gas having an increased temperature flows into the pressure difference power generation facility 2100. The pressure difference power generation facility 2100 generates electricity by lowering the pressure and temperature of the natural gas are lowered. Since the temperature of the natural gas increase when the natural gas passes through the fuel gas heater 2400, the output power of the pressure difference power generation facility 1100 increases.

The natural gas passing through the pressure difference power generation facility 2100 is supplied to the gas turbine power generation facility 2200 as fuel. The gas turbine power generation facility 2200, which generates electricity by burning the natural gas, discharges a flue gas. The discharged flue gas performs heat exchange with the working fluid to be used by the supercritical fluid power generation facility 2500, in the waste heat recovery heat exchange facility 2600.

Next, the working fluid that is heated through the heat exchange in the waste heat recovery heat exchange facility 2600 flows into the supercritical fluid power generation facility 2500, and the supercritical fluid power generation facility 2500 generates electricity using the heated working fluid. The supercritical fluid power generation facility 2500 discharges the working fluid to the LNG heat exchange facility 2700.

In the LNG heat exchange facility 2700, the working fluid exchanges heat with liquefied natural gas. Through this heat exchange process, the temperature of the liquefied natural gas rises and the temperature of the working fluid drops. Thus, the liquefied natural gas is regasified into natural gas and the working fluid is cooled. The cooled working fluid is sent to the waste heat recovery heat exchange facility 2600 by a pump P.

In another embodiment of the present invention, as illustrated in FIG. 2B, the combined power generation system 2000 may further include an NG temperature measurement unit Tn. The NG temperature measurement unit Tn measures the temperature of the natural gas flowing into the pressure difference power generation facility 2100 via the fuel gas heater 2400. The air flow control valve 2312 regulates the flow rate of the air flowing into the fuel gas heater 2400 according to the temperature of the natural gas measured by the NG temperature measurement unit Tn. For example, when the temperature measured by the NG temperature measuring unit Tn is low, the air flow control valve 2312 is controlled to increase the flow rate of the air flowing into the fuel gas heater 2400. In this case, the temperature of the natural gas flowing into the pressure difference generation facility 2100 is increased.

In the embodiment of the present invention, as illustrated in FIG. 2C, the combined power generation system 2000 may further include a working fluid heat exchanger 2800.

In the working fluid heat exchanger 2800, heat exchange occurs between the working fluid discharged from the supercritical fluid power generation facility 2500 and the working fluid passing through the LNG heat exchange facility 2700. Through the heat exchange, the working fluid passing through the LNG heat exchange facility 2700 has an increased temperature. The heated working fluid flows into the waste heat recovery heat exchange facility 2600. In one embodiment, the working fluid heat exchanger 2800 may be a recuperator.

Since the working fluid which to flow into the waste heat recovery heat exchange facility 2600 is primarily heated in the working fluid heat exchanger 2800, the heat exchange efficiency in the waste heat recovery heat exchange facility 2600 increases. Accordingly, waste heat utilization efficiency of the gas turbine power generation facility 2200 is improved, and power generation efficiency of the supercritical fluid power generation facility 2500 is improved. That is, the overall power generation efficiency of the power generation system is improved.

In another embodiment of the present invention, as illustrated in FIG. 2D, the combined power generation system 2000 may further include an air heat exchanger 2900.

In the air heat exchanger 2900, heat exchange occurs between the working fluid passing through the LNG heat exchange facility 2800 and the air that flows along the air inflow channel 2320. To this end, the air heat exchanger 2900 may be installed on the cooling air inflow channel 2320. In the present embodiment, the air heat exchanger 2900 is disposed closer to the turbine 2230 of the gas turbine power generation facility 2200 than the cooling fan 2321.

The working fluid passing through the LNG heat exchange facility 2800 undergoes heat exchange with the air, in the air heat exchanger 2900, and then flows into the waste heat recovery heat exchange facility 2600. In the present embodiment, the working fluid which has undergone heat exchange in the air heat exchanger 2900 passes through the working fluid heat exchanger 2800 and then flows into the waste heat recovery heat exchange facility 2600.

In this way, through the heat exchange between the air and the working fluid in the air heat exchanger 2900, the residual heat in the air can be transferred to the supercritical fluid power generation facility 2500. Thus, the power generation efficiency of the supercritical fluid power generation facility 2500 is improved. In addition, the temperature of the air flowing into the turbine of the gas turbine power generation facility 2200 is lowered, which improves the effect of cooling the turbine.

In another embodiment of the present invention, as illustrated in FIG. 2E, the LNG heat exchange facility 2700 of the combined power generation system 2000 may include a mediation fluid circulation unit 2710.

The mediation fluid circulation unit 2710 mediates the heat exchange between the liquefied natural gas and the working fluid. To this end, the mediation fluid circulation unit 2710 is configured to circulate a mediation fluid and is provided with two heat exchangers 2700a and 2700b. The mediation fluid may be a highly stable fluid such as nitrogen, argon, or the like.

In the first heat exchanger 2700b, heat exchange occurs between the working fluid and the mediation fluid. In the second heat exchanger 2700a, heat exchange occurs between the working fluid and the liquefied natural gas. The mediation fluid gains heat from the working fluid and transfers the heat to the liquefied natural gas. The liquefied natural gas is thus regasified into natural gas.

In another embodiment, the LNG heat exchange facility 2700 may include a buffering unit 2720. The buffering unit 2720 prevents explosions attributable to expansion of the mediation fluid. The buffering unit 2720 may include a valve to regulate the flow rate of the mediation fluid flowing from the mediation fluid circulation unit 2710 to the buffering unit 2720.

Figure 3A:
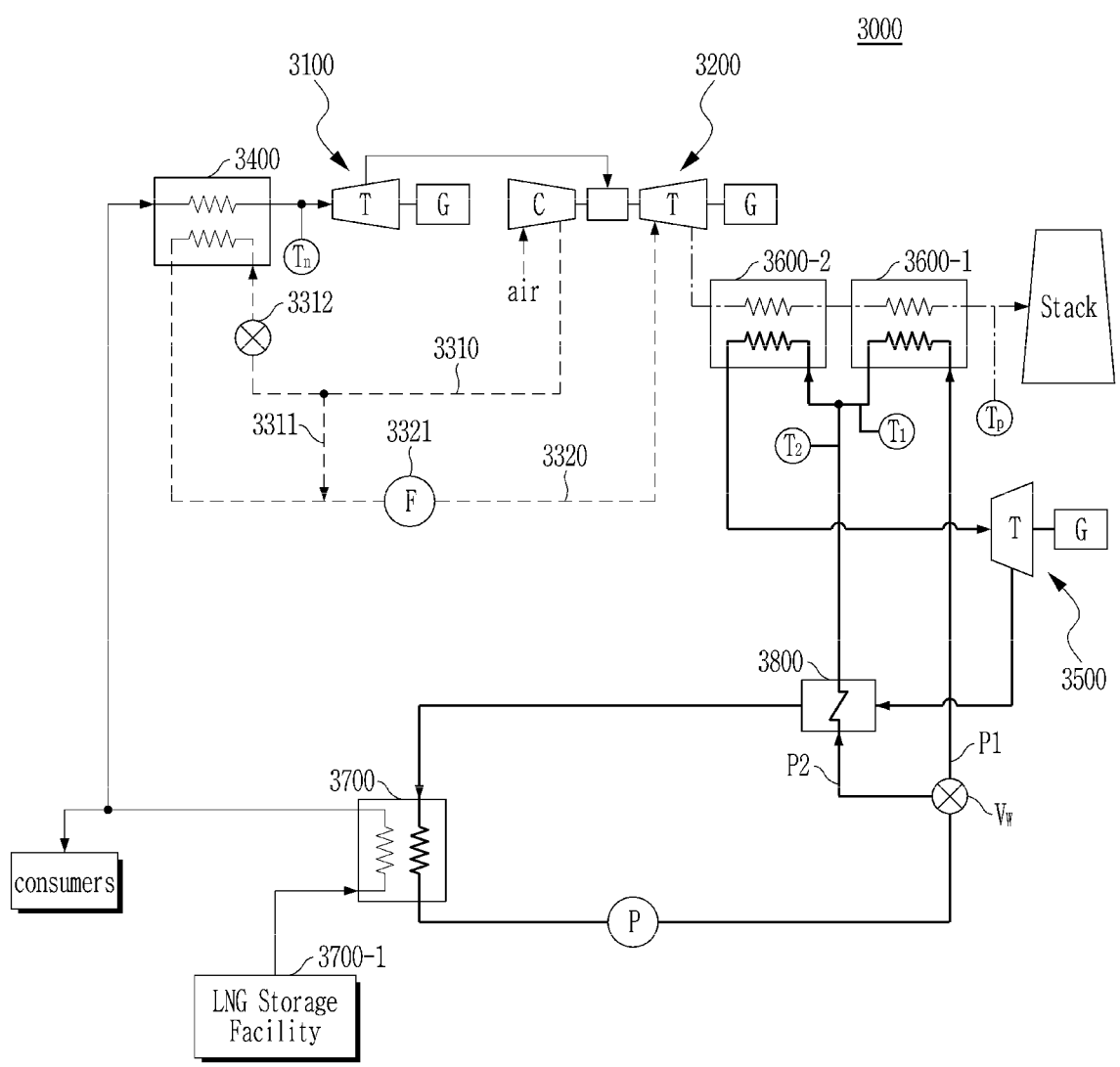
FIG. 3A is a block diagram of a combined power generation system performing pressure difference power generation according to one embodiment of the invention, the system including two waste heat recovery heat exchange facilities.
Figure 3B:
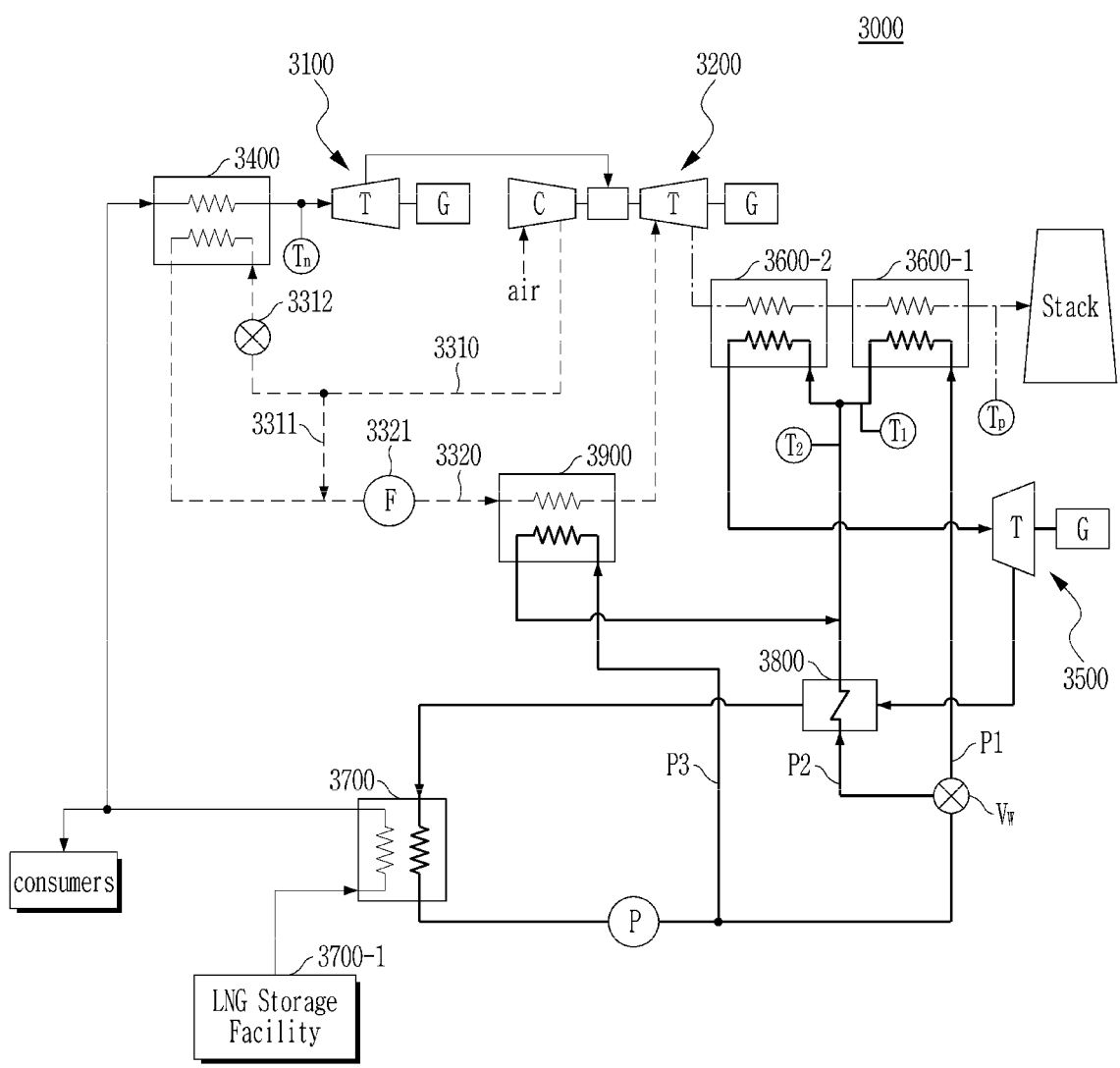
FIG. 3B is a block diagram of a combined power generation system performing pressure difference power generation according to one embodiment of the invention, the system including two waste heat recovery heat exchange facilities and an air heat exchanger.
Figure 3C:
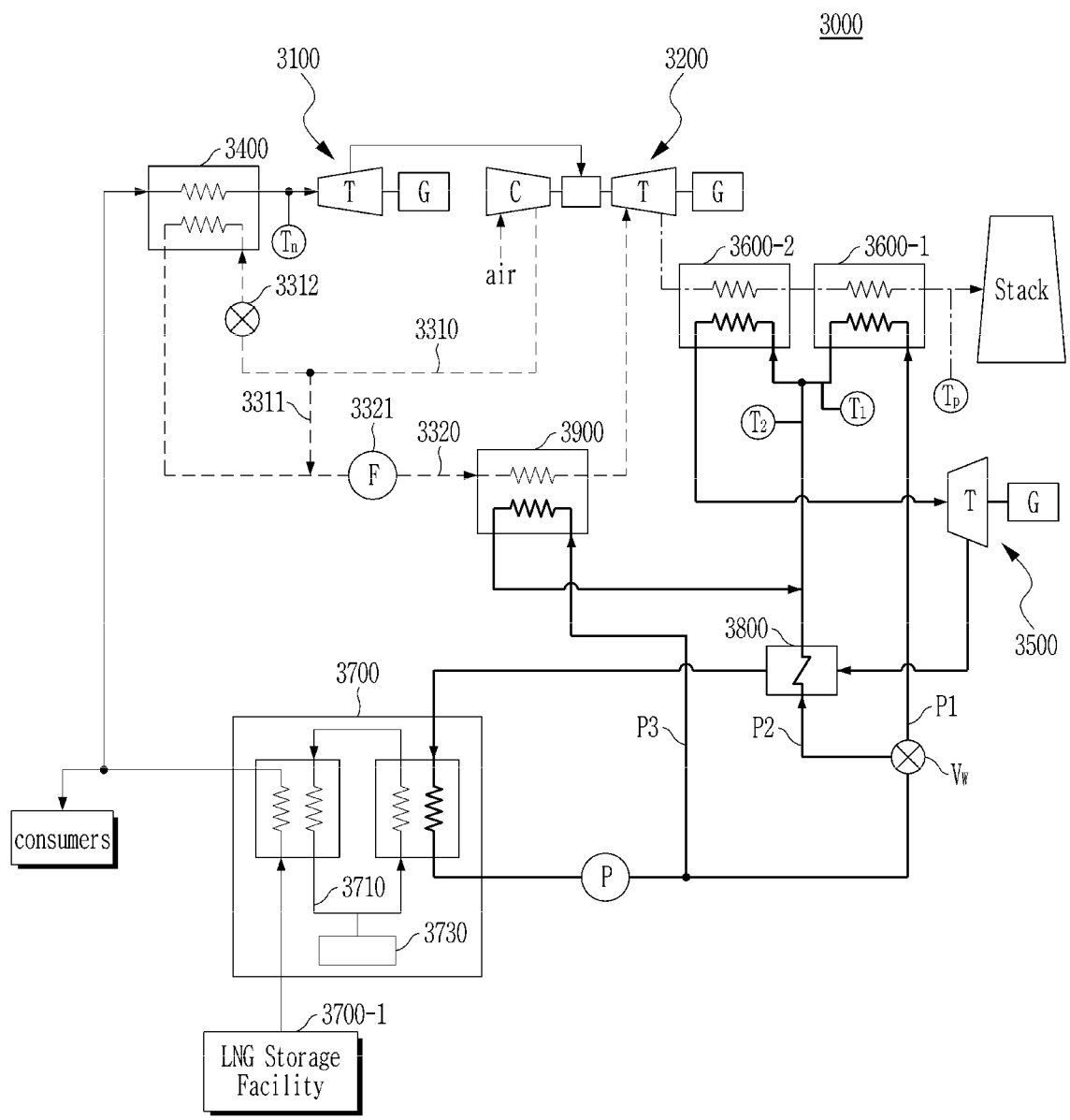
FIG. 3C is a block diagram of a combined power generation system performing pressure difference power generation according to one embodiment of the invention, the system including an LNG heat exchange facility having a mediation fluid circulation unit.
Figure 3D:
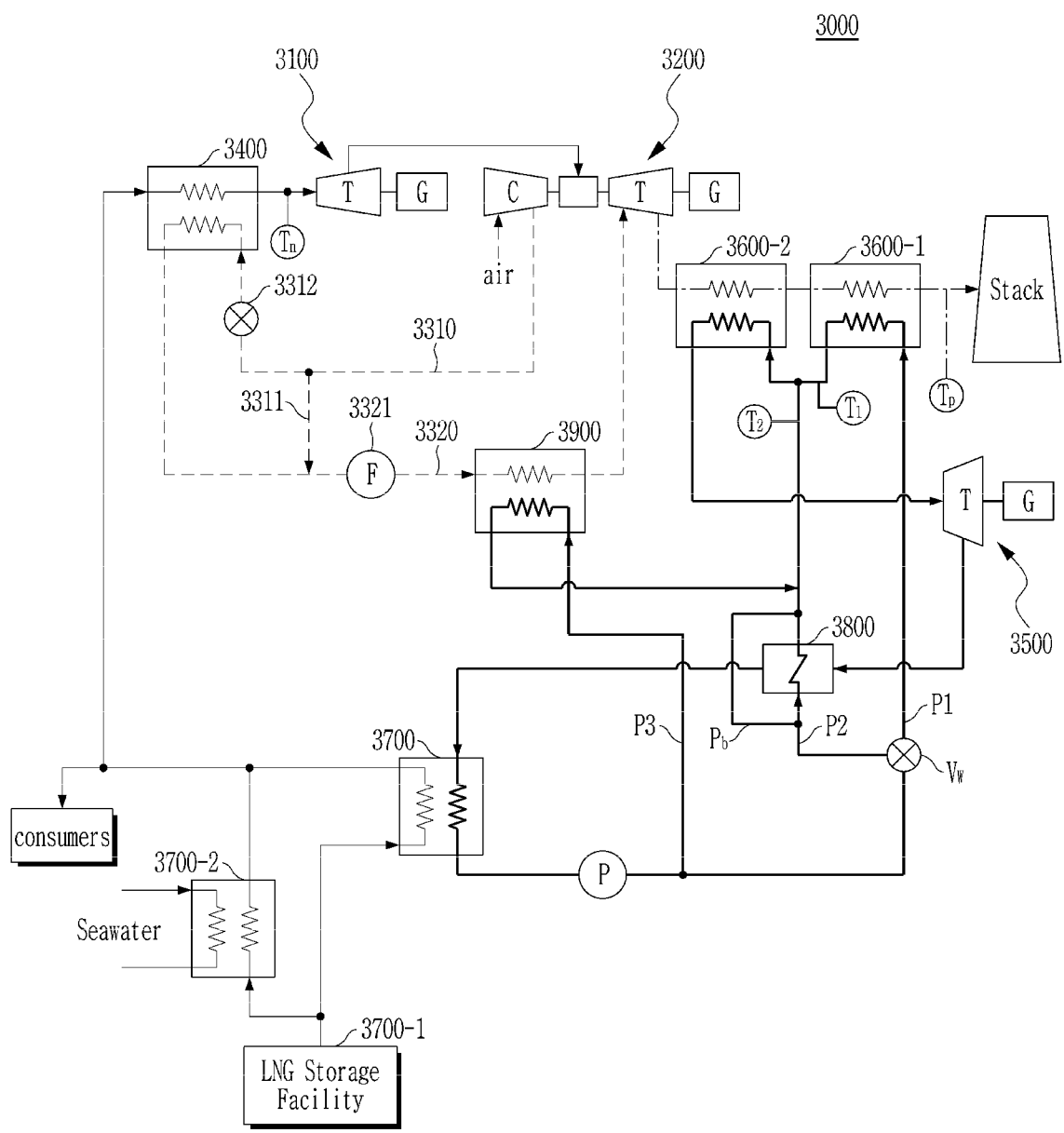
FIG. 3D is a block diagram of a combined power generation system performing pressure difference power generation according to one embodiment of the invention, the system including a heating facility and a natural gas (NG) bypass channel.

FIGS. 3A to 3D each show a combined power generation system performing pressure difference power generation according to one embodiment of the invention, with the system of FIG. 3A including two waste heat recovery heat exchange facilities, the system of FIG. 3B including two waste heat recovery heat exchange facilities and an air heat exchanger, the system of FIG. 3C including an LNG heat exchange facility having a mediation fluid circulation unit, and the system of FIG. 3D including a heating facility and a natural gas (NG) bypass channel.

As illustrated in FIG. 3A, according to one embodiment of the present invention, a combined power generation system 3000 generates electricity using a pressure difference. The combined power generation system 3000 includes a pressure difference power generation facility 3100, a gas turbine power generation facility 3200, an air discharge channel 3310, a fuel gas heater 3400, a cooling air inflow channel 3320, a supercritical fluid power generation facility 2500, a first waste heat recovery heat exchange facility 3600-1, a second waste heat recovery heat exchange facility 3600-2, and an LNG heat exchange facility 3700. Among the components of the system in the present embodiment, the same components as those in FIGS. 2A and 2E will not be described in detail.

The first waste heat recovery heat exchange facility 3600-1 and the second waste heat recovery heat exchange facility 3600-2 are installed in the flue gas flow path along which the flue gas discharged from the gas turbine power generation equipment 3200 flows. The flue gas discharged from the gas turbine power generation facility 3200 sequentially passes through the second waste heat recovery heat exchange facility 3600-2 and the first waste heat recovery heat exchange facility 3600-1 and then flows into a stack.

A portion of the working fluid discharged from the LNG heat exchange facility 3700 flows into the first waste heat recovery heat exchange facility 3600-1 via a first flow channel P1 and undergoes heat exchange with the flue gas discharged from the gas turbine power generation facility 3200. The remainder of the working fluid discharged from the LNG heat exchange facility 3700 flows along a second flow channel P2. The working fluid passing through the first waste heat recovery heat exchange facility 3600-1 merges with the working fluid passing through the second flow channel P2, and then the merged stream of the working fluid flows into the second waste heat recovery heat exchange facility 3600-2.

As described above, the working fluid having undergone the heat exchange in the LNG heat exchange facility 3700 is divided into two streams that respectively flow into the first flow channel P1 and the second flow channel P2, and then the two streams separately undergo heat exchange with the flue gas respectively in the first waste heat recovery heat exchange facility 3600-1 and in the second waste heat recovery heat exchange facility 3600-2. Therefore, the overall heat exchange efficiency is increased.

The combined power generation system 3000 performing pressure difference power generation, according to the present embodiment, further includes a flue gas temperature measurement unit Tp, a first temperature measurement unit T1, a second temperature measurement unit T2, and a working fluid flow control valve Vw.

The flue gas temperature measurement unit Tp measures the temperature of the flue gas passing through the first waste heat recovery heat exchange facility 3600-1. The first temperature measurement unit T1 measures the temperature of the working fluid passing through the first waste heat recovery heat exchange facility 3600-1. The second temperature measurement unit T2 measures the temperature of the working fluid passing through the working fluid heat exchanger 3800.

The working fluid flow control valve Vw regulates the flow rates of the streams of the working fluid flowing into the first flow channel P1 and the second flow channel P2. In the present embodiment, the working fluid flow control valve Vw is configured with one value which is installed at a junction point where the first flow channel P1 and the second flow channel P2 branch off. In another embodiment, the working fluid flow control valve Vw may be configured with two valves that are respectively installed on the first flow channel P1 and the second flow channel P2.

The working fluid flow control valve Vw regulates the flow rate of the working fluid flowing into the first flow channel P1 according to the temperature measured by the flue gas temperature measurement unit Tp. In one embodiment, the working fluid flow control valve Vw is controlled to increase the flow rate of the working fluid flowing into the first flow channel P1 according to the temperature measured by the flue gas temperature measurement unit Tp. Accordingly, the flow rate of the working fluid flowing into the first waste heat recovery heat exchange facility 3600-1 is increased, and a larger amount of heat of the flue gas is transferred to the working fluid. After this heat exchange is performed, the temperature of the working fluid measured by the flue gas temperature measurement unit Tp drops.

The working fluid control valve Vw regulates the flow rate of the working fluid flowing into the second flow channel P2 according to a difference between the temperatures measured by the first temperature measurement unit T1 and the second temperature measurement unit T2. In one embodiment, the working fluid control valve Vw is controlled to lower the flow rate of the working fluid flowing into the second flow channel P2 when the difference between the temperatures of the working fluid measured by the first temperature measurement unit T1 and the second temperature measurement unit T2 increases. Accordingly, the flow rate of the working fluid flowing from the LNG heat exchange facility 3700 to the working fluid heat exchange facility 3800 decreases but the flow rate of the working fluid discharged from the supercritical fluid power generation facility 3500 does not change. Accordingly, the heat exchange efficiency of the working fluid heat exchanger 3800 increases and the working fluid flowing into the second waste heat recovery heat exchange facility 3600-2 via the second flow channel P2 bears more heat.

In another embodiment, the working fluid control valve Vw may regulate the flow rate of the working fluid such that the difference between the temperatures measured by the first temperature measurement unit T1 and the second temperature measurement unit T2 is maintained under a predetermined temperature gap value. The working fluid control valve Vw is controlled to lower the flow rate of the working fluid flowing into the second flow channel P2 when the difference between the temperatures measured by the first temperature measurement unit T1 and the second temperature measurement unit T2 exceeds the predetermined temperature gap value.

In another embodiment of the present invention, as illustrated in FIG. 3B, the combined power generation system 3000 may further include an air heat exchanger 3900.

In the air heat exchanger 3900, heat exchange occurs between the working fluid passing through the LNG heat exchange facility 3800 and the air that flows along the air inflow channel 3320. To this end, the air heat exchanger 3900 may be installed on the cooling air inflow channel 3320. In the present embodiment, the air heat exchanger 3900 is positioned closer to the turbine of the gas turbine power generation facility 3200 than the cooling fan 3321.

In the present embodiment, the working fluid passing through the LNG heat exchange facility 2800 is divided into three streams respectively flowing into a first flow channel P1, a second flow channel P2, and a third flow channel P3. The working fluid flowing along the first flow channel P1 flows into the first waste heat recovery heat exchange facility 3600-1. The working fluid flowing along the second flow channel P2 is heated in the working fluid heat exchanger 3800 by undergoing heat exchange with the working fluid discharged from the supercritical fluid power generation facility 3500, and then the heated working fluid flows into the second waste heat recovery heat exchange facility 3600-2. The working fluid flowing along the third flow channel P3 is heated in the air heat exchanger 3900 and then the heated working fluid flows into the second flow channel P2. In another embodiment, the working fluid flowing along the third flow channel P3 may flow into the first flow channel P1 after passing through the air heat exchanger 3900.

In this way, through the heat exchange performed between the air and the working fluid in the air heat exchanger 3900, the residual heat in the air can be transferred to the supercritical fluid power generation facility 3500 Thus, the power generation efficiency of the supercritical fluid power generation facility 3500 increases. In addition, since the temperature of the air flowing into the turbine of the gas turbine power generation facility 3200 is lowered, the effect of cooling the turbine is enhanced.

In another embodiment of the present invention, as illustrated in FIG. 3C, the LNG heat exchange facility 3700 of the combined power generation system 3000 may include a mediation fluid circulation unit 3710 and a buffering unit 3720. Since the mediation fluid circulation unit 3710 and the buffering unit 3720 are described with reference to FIG. 2E above, their detailed description will be omitted here.

In another embodiment of the present invention, as illustrated in FIG. 3D, the working fluid heat exchanger 3800 may be provided with a bypass channel Pb.

In the present embodiment, the bypass channel Pb is connected to the second flow channel P2 such that the working fluid that is heated through the heat exchange performed in the LNG heat exchange facility 3700 can bypass the working fluid heat exchanger 3800. When the working fluid that has undergone the heat exchange in the LNG heat exchange facility 3700 flows along the bypass flow channel Pb3, the working fluid does not undergo heat exchange with the working fluid discharged from the supercritical power generation facility 3500. Accordingly, the working fluid flowing into the LNG heat exchange facility 4600 maintains a high temperature.

When the amount of the liquefied natural gas to be regasified is large, the working fluid flowing into the LNG heat exchange facility 3700 needs to be maintained at a high temperature even though the power generation efficiency of the supercritical fluid power generation facility 3500 is deteriorated somewhat. In this case, the working fluid needs to flow into the bypass channel Pb instead of flowing into the working fluid heat exchanger 3800.

In the present embodiment, the combined power generation system 3000 performing pressure difference power generation may include a heating facility 3700-2. The heating facility 3700-2 heats the liquefied natural gas stored in the LNG storage facility 3700-1 to regasify the liquefied natural into natural gas. To this end, the heating facility 3700-2 receives a hot fluid having a higher temperature than the liquefied natural gas and causes the hot fluid to perform heat exchange with the liquefied natural gas. In one embodiment, the hot fluid may be seawater.

When the gas turbine power generation facility 3200 is not in operation, the working fluid of the supercritical fluid power generation facility 3500 is not heated. In this state, the heat source for the regasification of the liquid natural gas is not supplied to the LNG heat exchange facility 3700. However, to enable customers to use natural gas at all times, for example, even while the gas turbine power generation facility 3200 is not operating, an additional facility to regasify the liquefied natural gas is required. The heating facility 3700-2 may be used in the case where the gas turbine power generation facility 3200 is not operating. Besides the case, the heating facility 3700-2 may also be used when a large amount of natural gas needs to be supplied due to an increase in the demand for the natural gas.

Figure 4A:
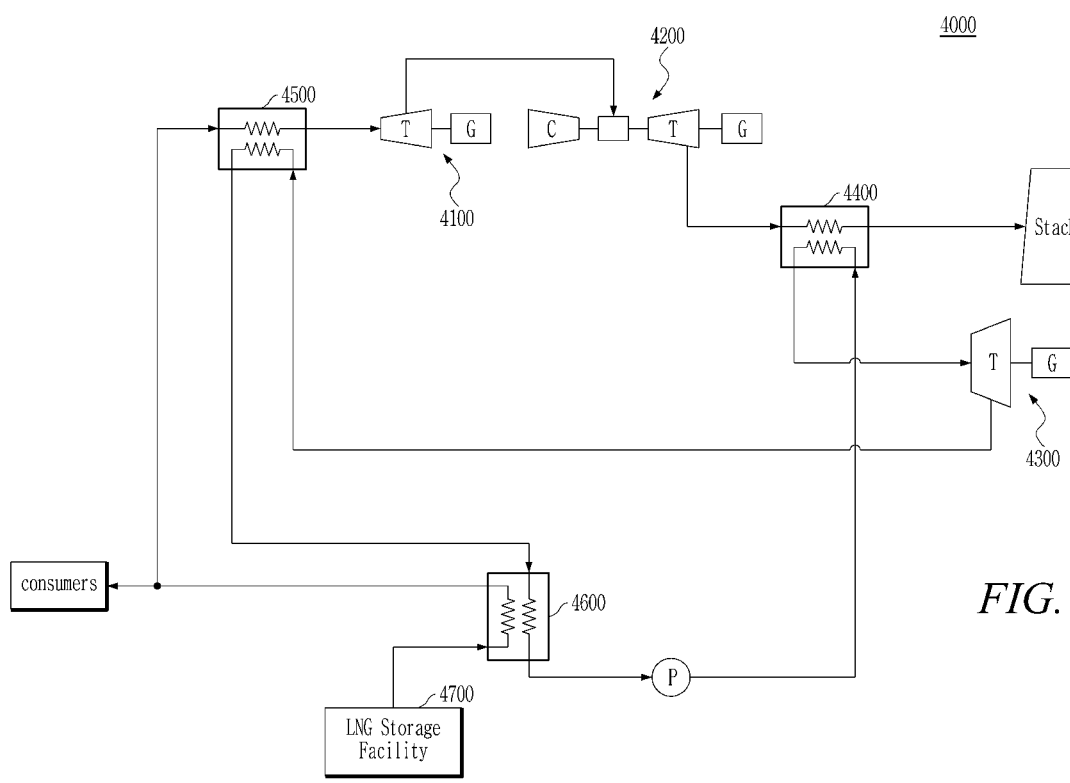
FIG. 4A is a block diagram of a combined power generation system performing pressure difference power generation according to one embodiment of the invention.
Figure 4B:
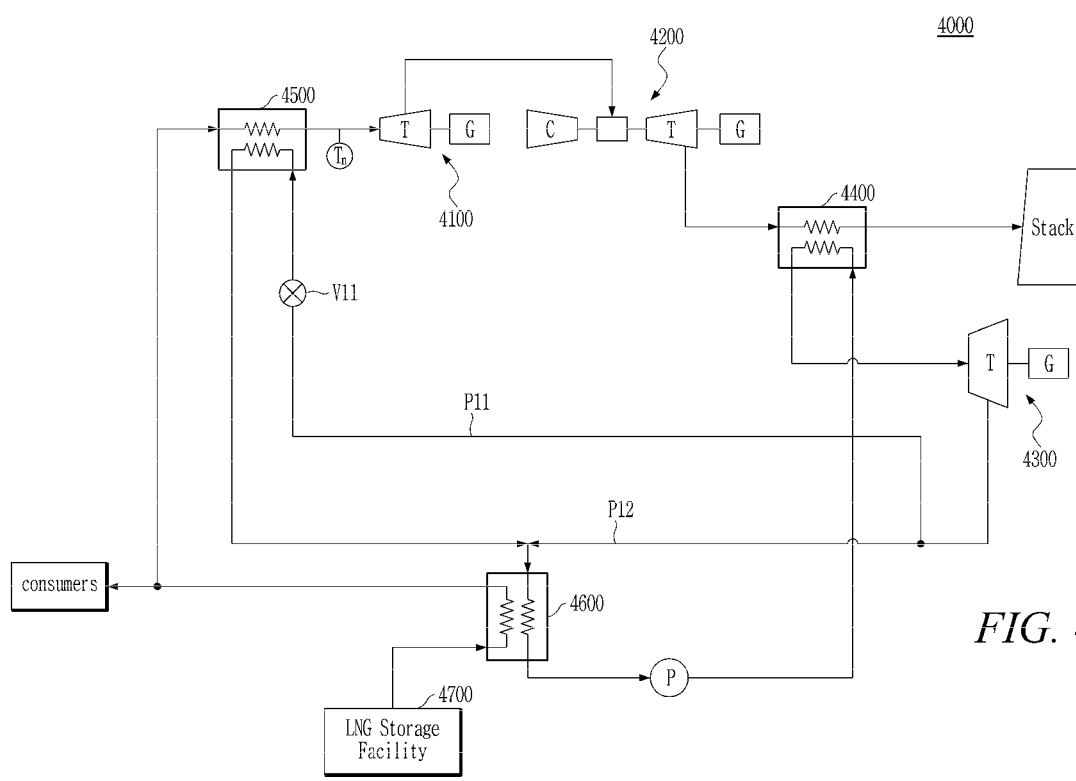
FIG. 4B is a block diagram of a combined power generation system performing pressure difference power generation according to one embodiment of the invention, in which working fluid of a supercritical fluid power generation facility is divided into branch streams.
Figure 4C:
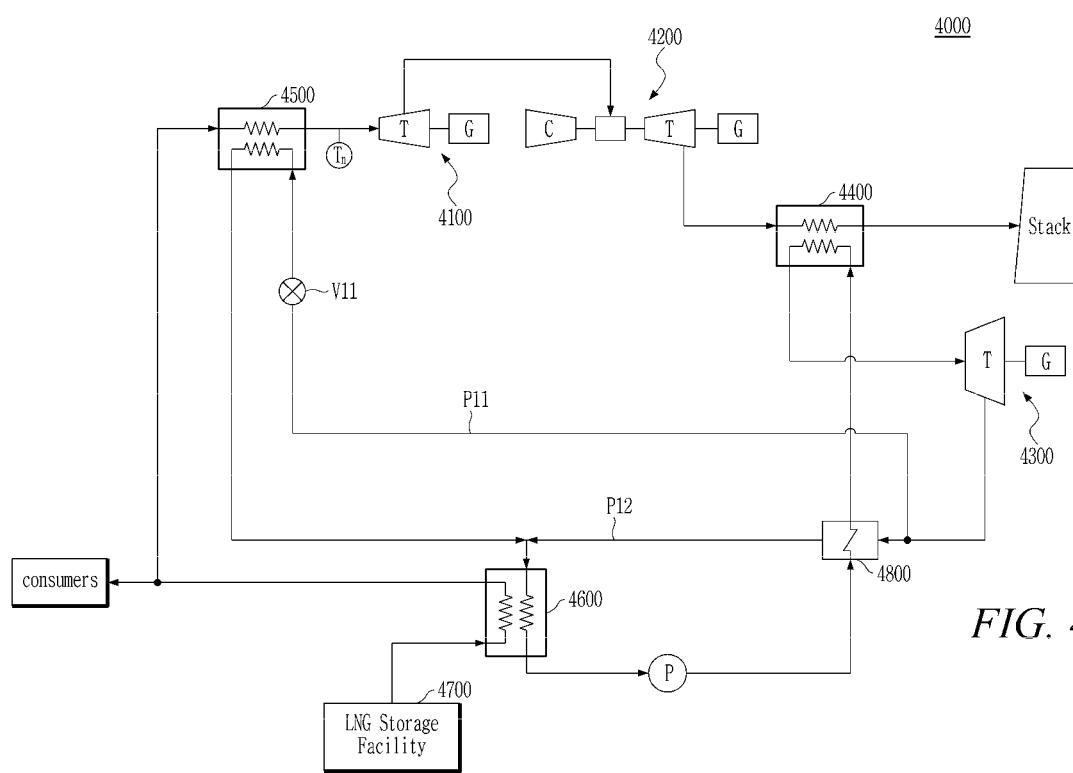
FIG. 4C is a block diagram of a combined power generation system performing pressure difference power generation according to one embodiment of the invention, the system including a working fluid heat exchanger.

FIGS. 4A to 4C each show a combined power generation system performing pressure difference power generation according to one embodiment of the invention. In system of FIG. 4B, working fluid of a supercritical fluid power generation facility is divided into branch streams, and in the system of FIG. 4C, a working fluid heat exchanger is included.

As illustrated in FIG. 4A, according to one embodiment of the present invention, a combined power generation system 4000 generates electricity using a pressure difference. The combined power generation system 4000 includes a pressure difference power generation facility 4100, a gas turbine power generation facility 4200, a supercritical fluid power generation facility 4300, a waste heat recovery heat exchange facility 4400, a fuel gas heater 4500, and an LNG heat exchange facility 4600.

In the fuel gas heater 4500, heat exchange occurs between working fluid discharged from the supercritical fluid power generation facility 4300 and air which to flow into the pressure difference power generation facility 4100. Through the heat exchange in the fuel gas heater, the natural gas is heated to a high temperature.

In the LNG heat exchange facility 4600, heat exchange occurs between the working fluid passing through the fuel gas heater 4500 and liquefied natural gas. In general, natural gas is extracted from an oil field or a gas field and is then liquefied to become liquefied natural gas (LNG) for easy transport of the natural gas. The liquefied natural gas is transported by a transportation means such as an LNG carrier and is then stored in an LNG storage facility 4700. The liquefied natural gas stored in the LNG storage facility 4700 is introduced into the LNG heat exchange facility 4600 to undergo heat exchange with the working fluid, thereby being regasified to become natural gas. In a case where liquefied natural gas is regasified into natural gas in this way, an additional energy source for the regasification is not required.

The LNG storage facility 4700 stores liquefied natural gas.

The natural gas that results from the regasification may be supplied to consumers and used in user places as fuel for driving various devices. In the present embodiment, a portion of the natural gas flows into the fuel gas heater 4500. In the fuel gas heater 4500, the natural gas undergoes heat exchange with the working fluid, thereby being heated to a higher temperature.

The natural gas having an increased temperature flows into the pressure difference power generation facility 4100. The pressure difference power generation facility 4100 generates electricity by lowering the pressure and temperature of the natural gas. Since the temperature of the natural gas rises when the natural gas passes through the fuel gas heater 4500, the output power of the pressure difference power generation facility 4100 increases.

The natural gas passing through the pressure difference power generation facility 4100 is supplied to the gas turbine power generation facility 4200 as fuel. The gas turbine power generation facility 4200, which generates electricity by burning the natural gas, discharges a flue gas. The discharged flue gas undergoes heat exchange with the working fluid which is to be used by the supercritical fluid power generation facility 4300, in the waste heat recovery heat exchange facility 4400.

Next, the working fluid heated through the heat exchange performed in the waste heat recovery heat exchange facility 4400 flows into the supercritical fluid power generation facility 4300, and the supercritical fluid power generation facility 4300 generates electricity by using the heated working fluid. The supercritical fluid power generation facility 4300 discharges the working fluid to the LNG heat exchange facility 4700.

In the fuel gas heater 4500, the working fluid undergoes heat exchange with the liquefied natural gas. Through the heat exchange, the liquefied natural gas is heated and the working fluid is cooled. The working fluid passing through the fuel gas heater 4500 flows into the LNG heat exchange facility 4600. In the LNG heat exchange facility, the working fluid undergoes heat exchange with the liquefied natural gas. Thus, the liquefied natural gas is regasified into natural gas and the working fluid is cooled. The cooled working fluid is sent to the waste heat recovery heat exchange facility 4400 by a pump P.

In another embodiment, as illustrated in FIG. 4B, the working fluid used in the supercritical fluid power generation facility 4300 flows through multiple flow channels. A portion of the working fluid discharged from the supercritical fluid power generation facility 4300 flows into the fuel gas heater 4500 via an eleventh flow channel P11. The working fluid flowing to the fuel gas heater 4500 via the eleventh flow channel P11 undergoes heat exchange with natural gas, and then flows into the LNG heat exchange facility 4500. Another portion of the working fluid discharged from the supercritical fluid power generation facility 4300 flows into the LNG heat exchange facility 4600 via a twelfth flow channel P12. Therefore, the LNG heat exchange facility 4600 is supplied with the working fluid that has undergone heat exchange in the fuel gas heater 4500 and the working fluid that has not undergone heat exchange after being discharged from the supercritical fluid power generation facility 4300.

The combined power generation system 4000 may further include an NG temperature measurement unit Tn and an eleventh valve V11. The NG temperature measurement unit Tn measures the temperature of the natural gas flowing into the pressure difference power generation facility 4100 via the fuel gas heater 4500. The eleventh valve V11 regulates the flow rate of the working fluid flowing into the fuel gas heater 4500 via the eleventh flow channel P11. In the present embodiment, the eleventh valve V11 is installed on the eleventh flow channel P11. The eleventh valve V11 is upstream from the fuel gas heater 4500. However, the installation of the eleventh valve V11 may not be limited thereto. The eleventh valve V11 may be installed at a junction point between the eleventh flow channel P11 and the twelfth flow channel P12. In the present embodiment, the eleventh valve V11 regulates the flow rate of the working fluid flowing into the fuel gas heater 4500 according to the temperature of the natural gas measured by the NG temperature measurement unit Tn. For example, when the temperature of the working fluid measured by the NG temperature measurement unit Tn is low, the eleventh valve V11 is controlled to increase the flow rate of the working fluid flowing into the eleventh flow channel P11. Accordingly, it is possible to increase the temperature of the natural gas flowing into the pressure difference generation facility 4100.

In another embodiment of the present invention, as illustrated in FIG. 4C, the combined power generation system 4000 may further include a working fluid heat exchanger 4800. The working fluid heat exchanger 4800 is disposed on the twelfth flow channel P12.

Figure 5A:
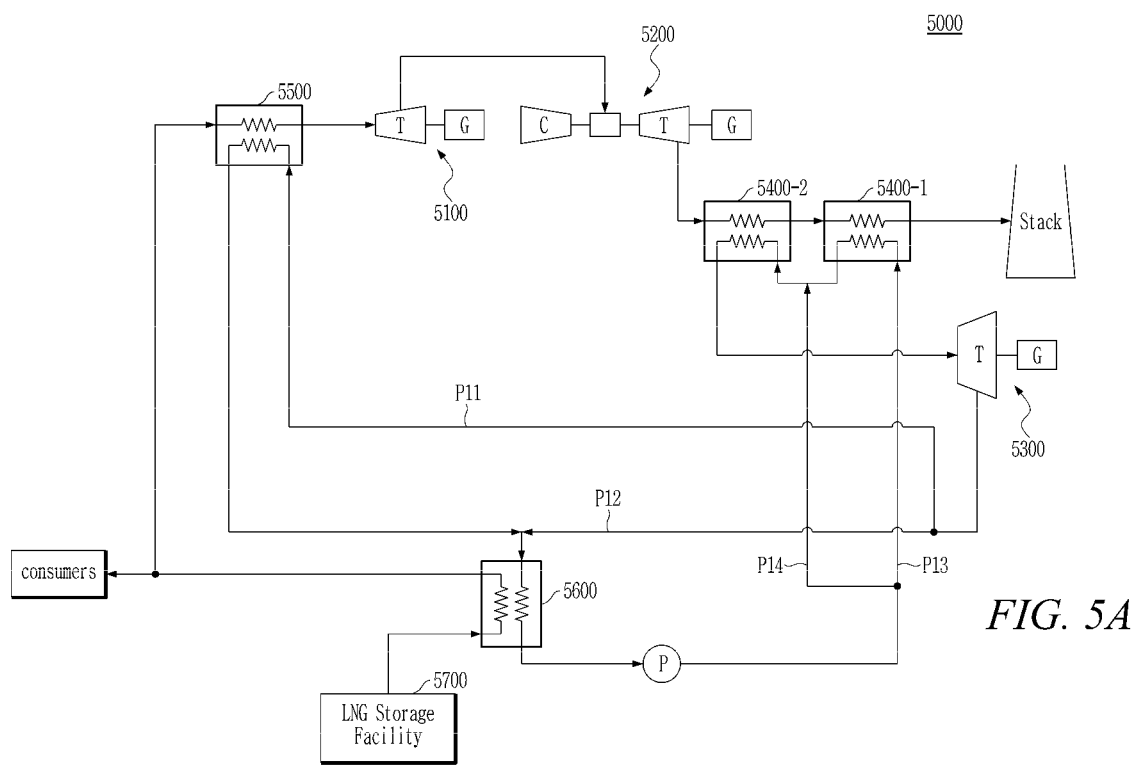
FIG. 5A is a block diagram of a combined power generation system performing pressure difference power generation according to one embodiment of the invention, the system including two waste heat recovery heat exchange facilities.
Figure 5B:
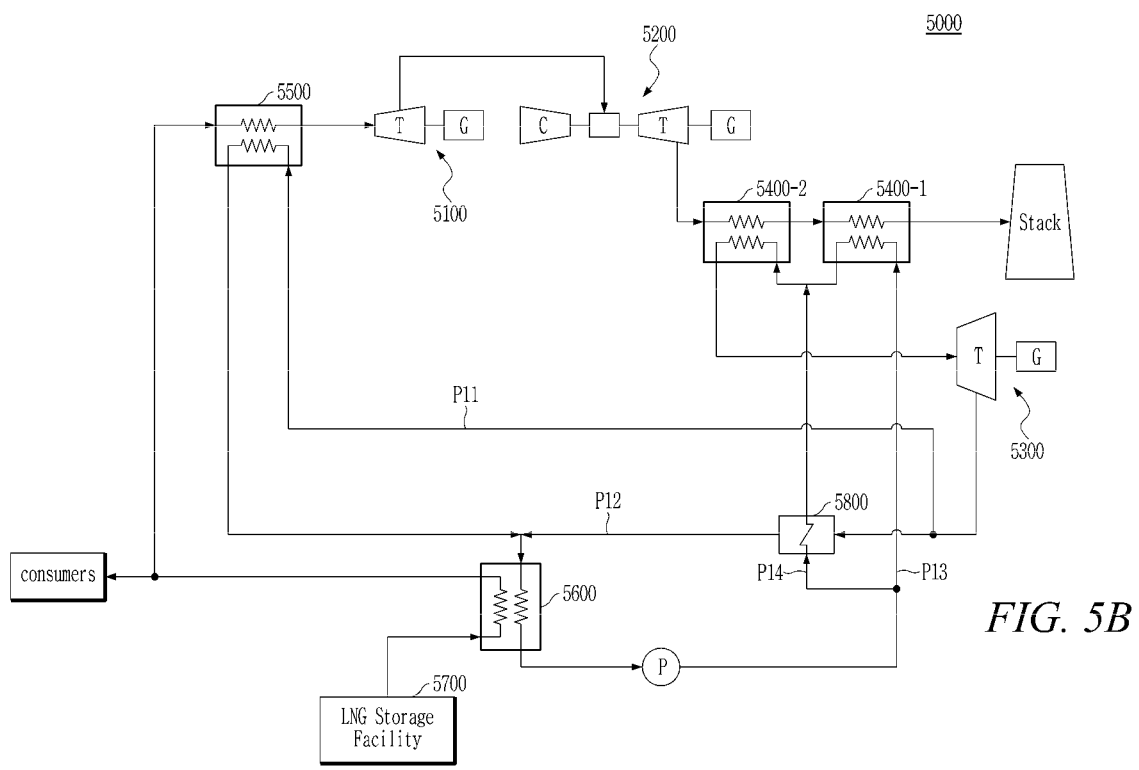
FIG. 5B is a block diagram of a combined power generation system performing pressure difference power generation according to one embodiment of the invention, the system including two waste heat recovery heat exchange facilities and a working fluid heat exchanger.
Figure 5C:
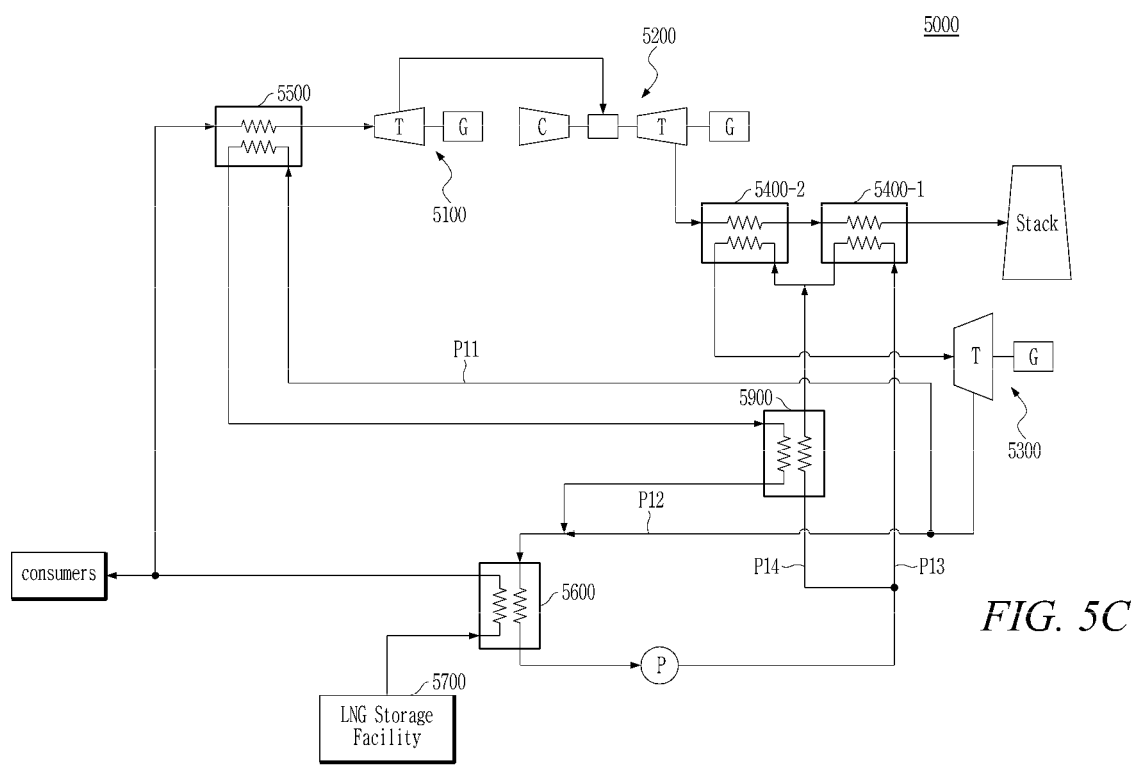
FIG. 5C is a block diagram of a combined power generation system performing pressure difference power generation according to one embodiment of the invention, the system including a first heat exchanger installed in a fourteenth flow channel.
Figure 5D:
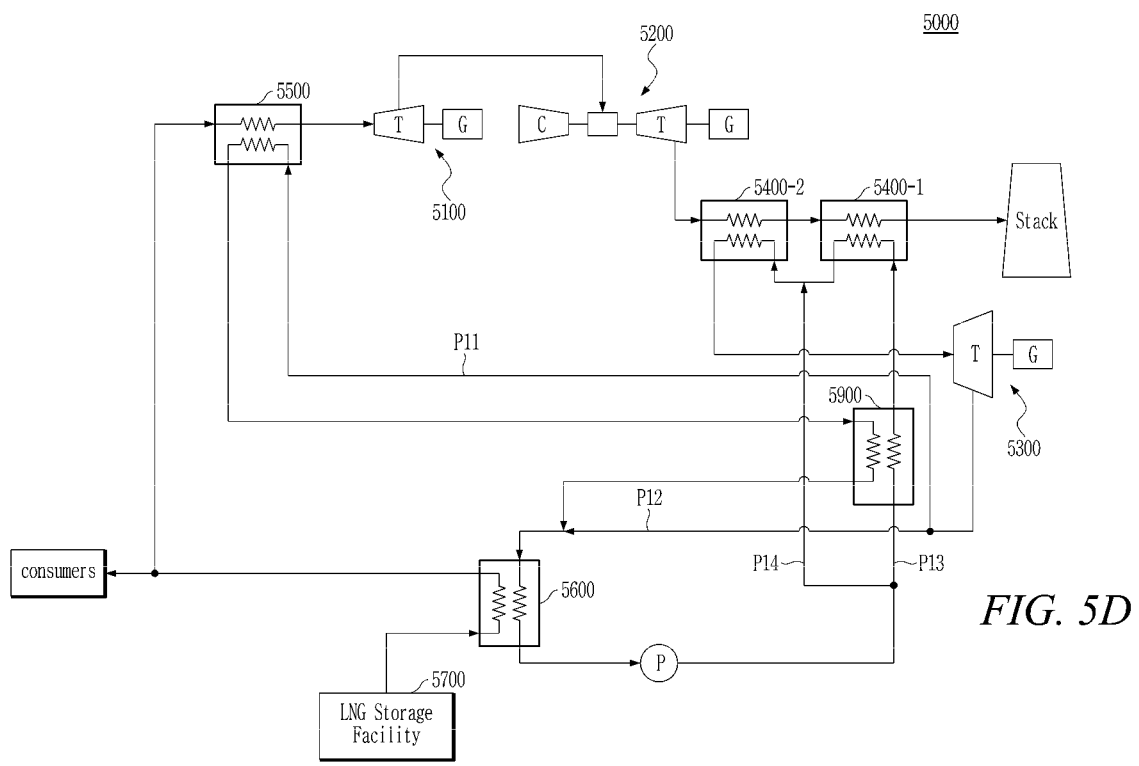
FIG. 5D is a block diagram of a combined power generation system performing pressure difference power generation according to one embodiment of the invention, the system including a first heat exchanger installed in a thirteenth flow channel.
Figure 5E:
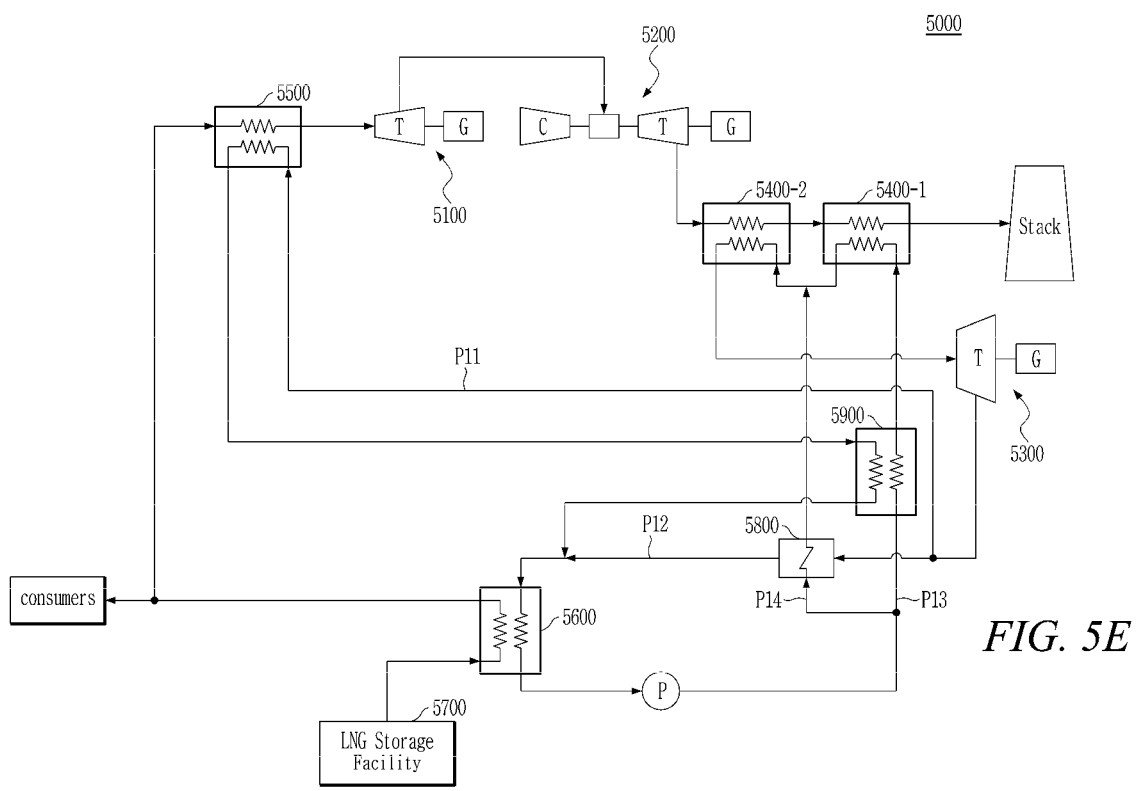
FIG. 5E is a block diagram of a combined power generation system performing pressure difference power generation according to one embodiment of the invention, the system including a first heat exchanger installed in a thirteenth flow channel and a working fluid heat exchanger.
Figure 5F:
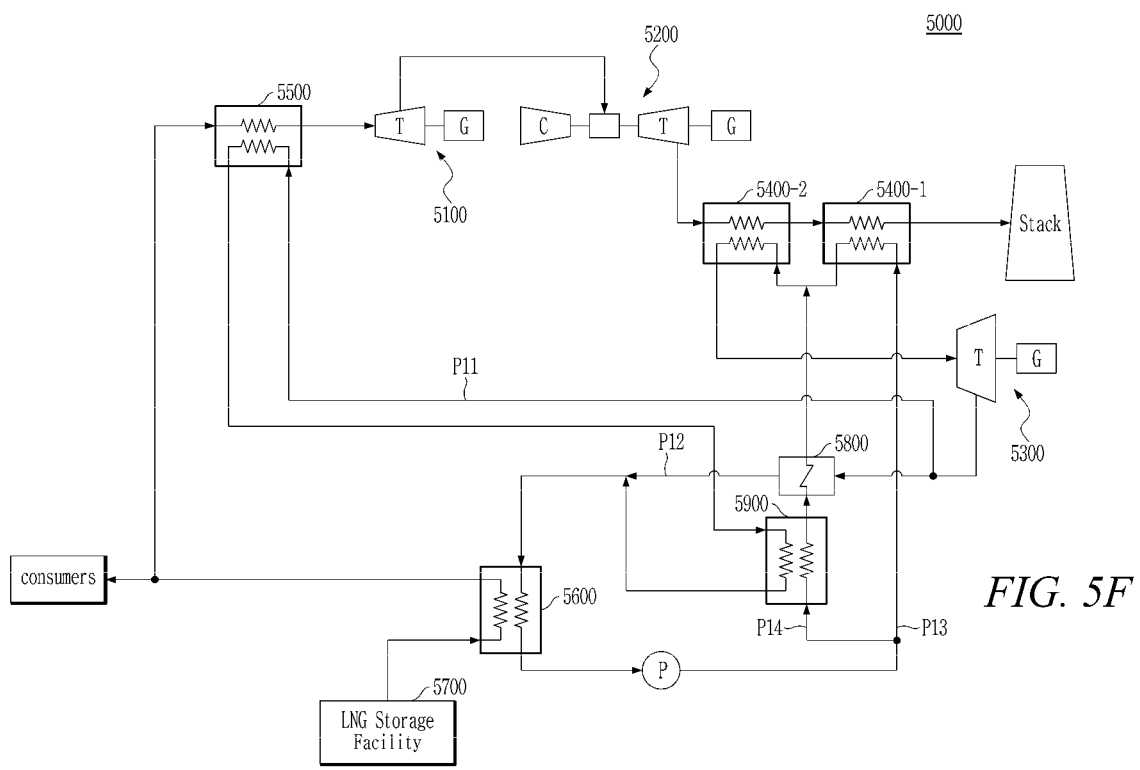
FIG. 5F is a block diagram of a combined power generation system performing pressure difference power generation according to one embodiment of the invention, the system including a first heat exchanger installed in a fourteenth flow channel and a working fluid heat exchanger.
Figure 5G:
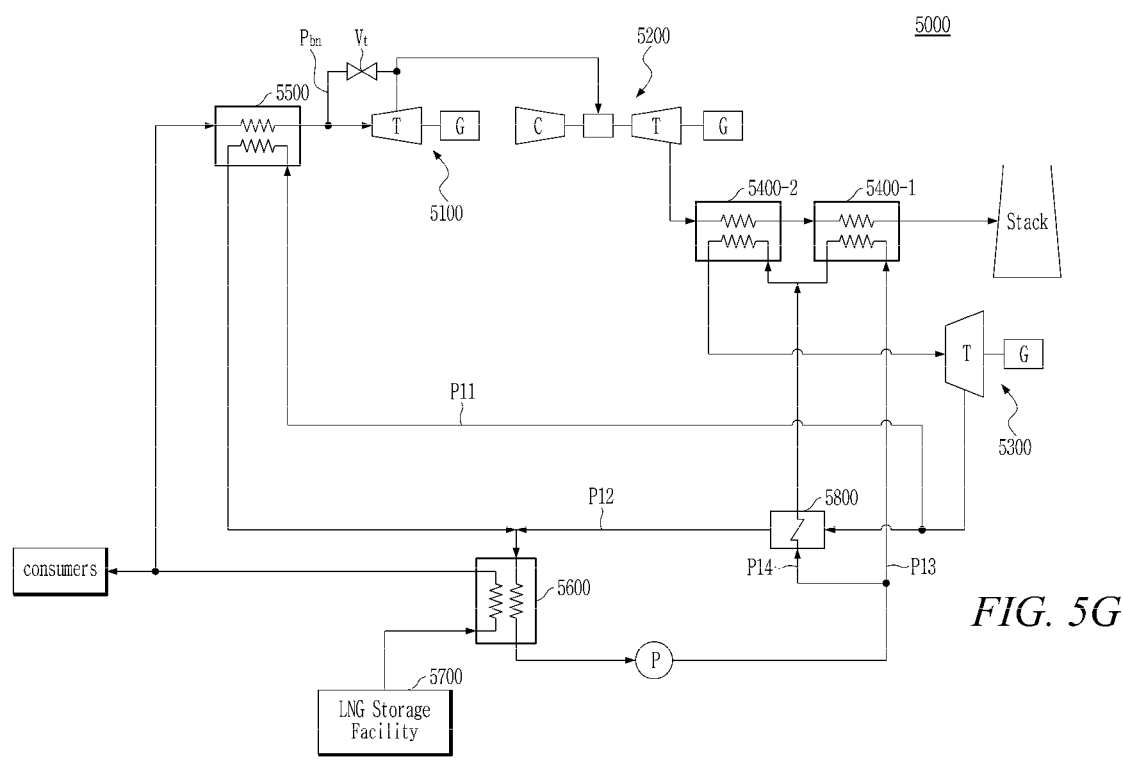
FIG. 5G is a block diagram of a combined power generation system performing pressure difference power generation according to one embodiment of the invention, the system including an NG bypass flow channel.

FIGS. 5A to 5G each show a combined power generation system performing pressure difference power generation according to one embodiment of the invention, with the system of FIG. 5A including two waste heat recovery heat exchange facilities, the system of FIG. 5B including two waste heat recovery heat exchange facilities and a working fluid heat exchanger, the system of FIG. 5C including a first heat exchanger installed in a fourteenth flow channel, the system of FIG. 5D including a first heat exchanger installed in a thirteenth flow channel, the system of FIG. 5E including a first heat exchanger installed in a thirteenth flow channel and a working fluid heat exchanger, the system of FIG. 5F including a first heat exchanger installed in a fourteenth flow channel and a working fluid heat exchanger, and the system of FIG. 5G including an NG bypass flow channel.

As illustrated in FIG. 5A, according to one embodiment of the present invention, a combined power generation system 5000 generates electricity using a pressure difference. The combined power generation system 5000 includes a pressure difference power generation facility 5100, a gas turbine power generation facility 5200, a supercritical fluid power generation facility 5300, a first waste heat recovery heat exchange facility 5400-1, a second waste heat recovery heat exchange facility 5400-2, a fuel gas heater 5500, an LNG heat exchange facility 5600, and an LNG storage facility 5700. Among the components of the systems illustrated FIGS. 5A to 5G, the same components as those in FIGS. 4A and 4C will not be described in detail.

The first waste heat recovery heat exchange facility 5400-1 and the second waste heat recovery heat exchange facility 5400-2 are installed in the flue gas flow path along which the flue gas discharged from the gas turbine power generation equipment 5200 flows. The flue gas discharged from the gas turbine power generation facility 5200 sequentially passes through the second waste heat recovery heat exchange facility 5400-2 and the first waste heat recovery heat exchange facility 5400-1 and then flows into a stack.

A portion of the working fluid that undergoes heat exchange in the LNG heat exchange facility 5600 and is then discharged from the LNG heat exchange facility 5600, flows into the first waste heat recovery heat exchange facility 5400-1 via a thirteenth flow channel P13 and undergoes heat exchange with the flue gas discharged from the gas turbine power generation facility 5200. The remainder of the working fluid discharged from the LNG heat exchange facility 5600 flows via P14. The working fluid passing through the first waste heat recovery heat exchange facility 5400-1 merges with the working fluid passing through the fourteenth flow channel P14, and then the resulting merged stream of the working fluid flows into the second waste heat recovery heat exchange facility 5400-2.

As described above, the working fluid having undergone the heat exchange in the LNG heat exchange facility 5600 is divided into two streams that respectively flow into the thirteenth flow channel P13 and the fourteenth flow channel P14, and then the two streams separately undergo heat exchange with the flue gas respectively in the first waste heat recovery heat exchange facility 5400-1 and in the second waste heat recovery heat exchange facility 5400-2. Therefore, the overall heat exchange efficiency increases.

In another embodiment of the present invention, as illustrated in FIG. 5B, the combined power generation system 5000 may further include a working fluid heat exchanger 5800. The working fluid heat exchanger 5800 is disposed at a junction point between the twelfth flow channel P12 and the fourteenth flow channel P14.

In the working fluid heat exchanger 5800, heat exchange occurs between a portion of the working fluid having undergoing heat exchange in the LNG heat exchange facility 5600 and then flowing via the fourteenth flow channel P14 and the working fluid discharged from the supercritical fluid power generation facility 5300 and then flowing via the twelfth flow channel P12.

Since the working fluid flowing into the waste heat recovery heat exchange facility 5400-2 is heated in the working fluid heat exchanger 5800, the heat exchange efficiency in the waste heat recovery heat exchange facility 5400-2 increases. Accordingly, waste heat utilization efficiency of the gas turbine power generation facility 5200 increases, and power generation efficiency of the supercritical fluid power generation facility 5300 increases. That is, the overall power generation efficiency of the power generation system increases.

In another embodiment of the present invention, as illustrated in FIG. 5C, the combined power generation system 5000 may further include a first heat exchanger 5900. The first heat exchanger 5900 is disposed on the twelfth flow channel P14.

In the first heat exchanger 5900, heat exchange occurs between the working fluid passing through the fuel gas heater 5500 and the working fluid passing through the LNG heat exchange facility 5600 and then flowing via the fourteenth flow channel 14. Therefore, the working fluid passing through the first heat exchanger 5900 is heated in the fourteenth flow channel P14. After the working passes through the fuel gas heater 5500, it sequentially passes through the first heat exchanger 5900 and the supercritical fluid power generation facility 5300. Subsequently, the working fluid discharged from the supercritical fluid power generation facility 5300 merges with the working fluid passing through the twelfth flow channel P12 and then flows into the LNG heat exchange facility 5600.

In another embodiment of the present invention, as illustrated in FIG. 5D, the first heat exchanger 5900 may be disposed on the thirteenth flow channel P13. In this case, in the first heat exchanger 5900, the working fluid passing through the fuel gas heater 5500 and the working fluid passing through the LNG heat exchange facility 5600 and flowing through the thirteenth flow channel 13 exchange heat with each other. Therefore, the working fluid flowing along the thirteenth flow channel P13 is heated in the first heat exchanger 5900.

In another embodiment of the present invention, as illustrated in FIG. 5E, the combined power generation system 5000 may further include a working fluid heat exchanger 5800 and a first heat exchanger 5900. The working fluid heat exchanger 5800 is disposed at a junction point between the twelfth flow channel P12 and the fourteenth flow channel P14, and the first heat exchanger 5900 is disposed on the thirteenth flow channel P13.

In the working fluid heat exchanger 5800, heat exchange occurs between a portion of the working fluid having undergoing heat exchange in the LNG heat exchange facility 5600 and then flowing via the fourteenth flow channel P14 and the working fluid discharged from the supercritical fluid power generation facility 5300 and flowing via the twelfth flow channel P12. In the first heat exchanger 5900, heat exchange occurs between the working fluid passing through the fuel gas heater 5500 and the working fluid passing through the LNG heat exchange facility 5600 and flowing along the thirteenth flow channel 13. Therefore, both streams of the working fluid, that is, the working fluid introduced into the first waste heat recovery heat exchange facility 5400-1 and the working fluid introduced into the second waste heat recovery heat exchange facility 5400-2, are heated. Thus, the efficiency of using waste heat of the gas turbine power generation facility 5200 is improved, and the generation efficiency of the supercritical fluid power generation facility 5300 is also improved.

In another embodiment of the present invention, as illustrated in FIG. 5F, the first heat exchanger 5900 may be disposed on the fourteenth flow channel P14. The working fluid flowing along the fourteenth flow channel P14 sequentially passes through the first heat exchanger 5900 and the working fluid heat exchanger 5800.

The working fluid passing through the fuel gas heater 5500 has a lower temperature than the working fluid discharged from the supercritical fluid power generation facility 5300 and then flowing along the twelfth flow channel P12. The working fluid flowing along the fourteenth flow channel P14 undergoes heat exchange with the working fluid having a first high temperature in the first heat exchanger 5900, thereby being primarily heated, and then undergoes heat exchange with the working fluid having a second high temperature which is higher than the first high temperature in the working fluid heat exchanger 5800, thereby being secondarily heated. Therefore, the heat exchange efficiency in the working fluid heat exchanger 5800 is improved and the working fluid having a high temperature can be introduced into the second waste heat recovery heat exchanger 5400-2.

In another embodiment of the present invention, as illustrated in FIG. 5G, the pressure difference power generation facility 5100 may be provided with an NG bypass channel Pbn. The natural gas passing through the fuel gas heater 5500 flows along the NG bypass channel Pbn. Thus, the natural gas can be directly supplied to the gas turbine power generation facility 2200 without flowing through the pressure difference power generation facility 5100. That is, the natural gas may bypass the pressure difference power generation facility 5100. When it is unnecessary for the pressure difference power generation facility 5100 to generate electricity, the natural gas is guided to flow along the NG bypass channel Pbn.

A pressure reducing valve Vt may be installed on the NG bypass channel Pbn. Examples of the pressure reducing valve Vt include a throttling valve Vt. When the natural gas passes the pressure reducing valve Vt, the pressure of the natural gas drops. Thus, the pressure of the natural gas can be adjusted to a level required by the gas turbine power generation facility 5200.

Figure 6:
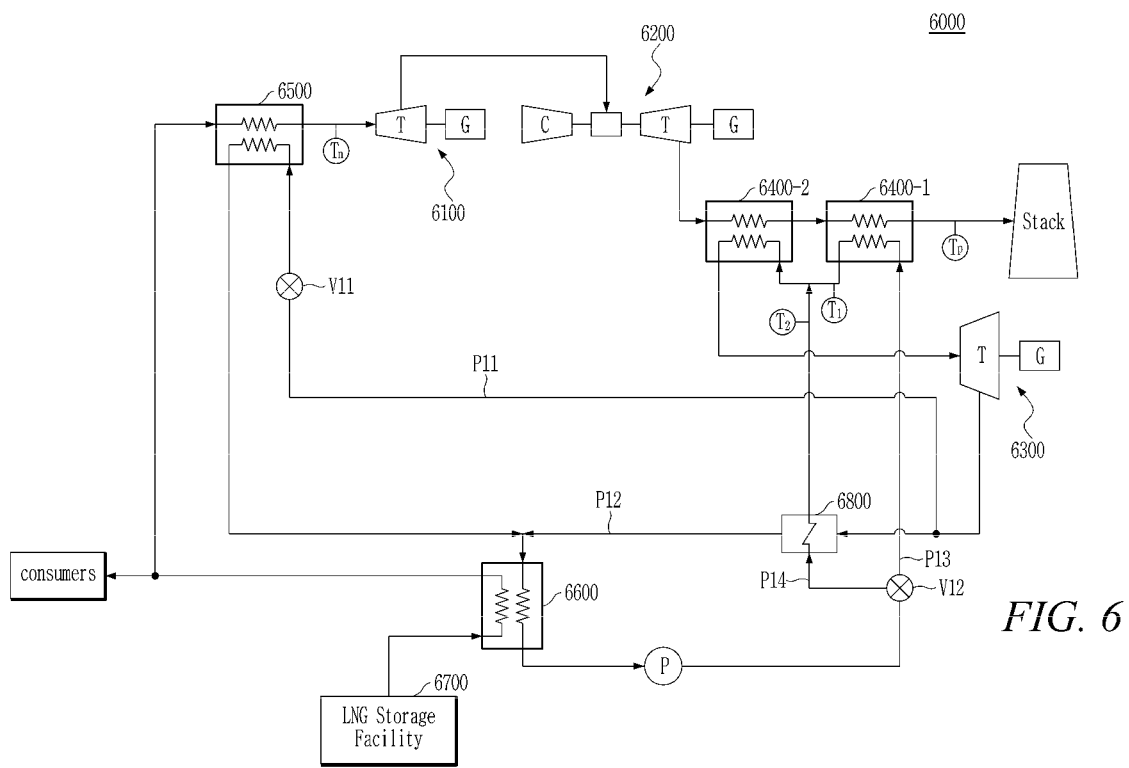
FIG. 6 is a block diagram of a combined power generation system performing pressure difference power generation according to one embodiment of the invention, the system including a gas temperature measurement unit and a twelfth valve to regulate the flow rate of a working fluid according to the flue gas temperature.

FIG. 6 shows a combined power generation system performing pressure difference power generation according to one embodiment of the invention, which is configured to regulate the flow rate of a working fluid according to the flue gas temperature.

As illustrated in FIG. 6, a combined power generation system 6000 according to one embodiment of the present invention includes a pressure difference power generation facility 6100, a gas turbine power generation facility 6200, a supercritical fluid power generation facility 6300, a first waste heat recovery heat exchange facility 6400-1, a second waste heat recovery heat exchange facility 6400-2, a fuel gas heater 6500, an LNG heat exchange facility 6600, an LNG storage facility 6700, a working fluid heat exchanger 6800, an NG temperature measurement unit Tn, a flue gas temperature measurement unit Tp, a first temperature measurement unit T1, a second temperature measurement unit T2, an eleventh valve V11, and a twelfth valve V12. Among the components of the system in the present embodiment, the same components as those in FIGS. 4A through 5G will not be described in detail.

The flue gas temperature measurement unit Tp measures the temperature of the flue gas passing through the first waste heat recovery heat exchange facility 6400-1. The first temperature measurement unit T1 measures the temperature of the working fluid passing through the first waste heat recovery heat exchange facility 6400-1. The second temperature measurement unit T2 measures the temperature of the working fluid passing through the second waste heat recovery heat exchange facility 6400-2.

The twelfth valve V12 regulates the flow rates of the working fluid flowing into a thirteenth flow channel P13 and a fourteenth flow channel P14. In the present embodiment, the twelfth valve V12 is configured with one value which is installed at a junction point where the thirteenth flow channel P13 and the fourteenth flow channel P14 branch off. In another embodiment, the twelfth valve V12 may be configured with two valves that are respectively installed on the thirteenth flow channel P13 and the fourteenth flow channel P14.

The twelfth valve V12 regulates the flow rate of the working fluid flowing into the thirteenth flow channel P13 according to the temperature measured by the flue gas temperature measurement unit Tp. In one embodiment, the twelfth valve V12 is controlled to increase the flow rate of the working fluid flowing into the thirteenth flow channel P13 according to the temperature measured by the flue gas temperature measurement unit Tp. Accordingly, the flow rate of the working fluid flowing into the first waste heat recovery heat exchange facility 6400-1 is increased, and the heat of the flue gas is more increasingly transferred to the working fluid. After this heat exchange is performed, the temperature of the working fluid measured by the flue gas temperature measurement unit Tp drops.

The twelfth valve V12 regulates the flow rate of the working fluid flowing into the fourteenth flow channel P14 according to a difference between the temperatures measured by the first temperature measurement unit T1 and the second temperature measurement unit T2. In one embodiment, the twelfth valve V12 is controlled to lower the flow rate of the working fluid flowing into the fourteenth flow channel P14 when the difference between the temperatures of the working fluid measured by the first temperature measurement unit T1 and the second temperature measurement unit T2 increases. Accordingly, the flow rate of the working fluid flowing from the LNG heat exchange facility 6600 to the working fluid heat exchange facility 6800 decreases but the flow rate of the working fluid discharged from the supercritical fluid power generation facility 6300 does not change. Accordingly, the heat exchange efficiency of the working fluid heat exchanger 6800 increases and the working fluid flowing into the second waste heat recovery heat exchange facility 6400-2 via the fourteenth flow channel P14 bears more heat.

In another embodiment, the twelfth fluid control valve V12 may regulate the flow rate of the working fluid such that the difference between the temperatures measured by the first temperature measurement unit T1 and the second temperature measurement unit T2 is maintained to be less than a predetermined temperature gap value. The twelfth fluid control valve V12 is controlled to lower the flow rate of the working fluid flowing into the fourteenth flow channel P14 when the difference between the temperatures measured by the first temperature measurement unit T1 and the second temperature measurement unit T2 exceeds the predetermined temperature gap value.

It will be apparent to those skilled in the art that various modifications, additions, and removals of some parts of the present invention may be made without departing from the spirit of the invention as defined in the appended claims, and ones resulting from the modifications, additions, and removals of the parts also will fall into the scope of the present invention.

What is claimed is:

1. A combined power generation system comprising: a pressure difference power generation facility for generating power using a change in pressure of natural gas; a gas turbine power generation facility comprising a compressor that takes in and compresses external air to produce compressed air, a combustor that mixes the compressed air and the natural gas passing through the pressure difference power generation facility and burns the mixture to produce a flue gas, a turbine having turbine rotor configured to be rotated by the flue gas, and a generator configured to be powered by the turbine; an air discharge channel via which a portion of the compressed air produced by the compressor of the gas turbine power generation facility is discharged; a supercritical fluid power generation facility for generating power using a supercritical working fluid heated by the flue gas generated by the gas turbine power generation facility; an LNG heat exchange facility in which heat exchange occurs between the working fluid discharged from the supercritical fluid power generation facility and liquefied natural gas (LNG), so that the working fluid is cooled and the liquefied natural gas is heated to be regasified into natural gas; a fuel gas heater receiving the aft flowing along the air discharge channel and the natural gas produced by the LNG heat exchange facility, the fuel gas heater configured to heat the received natural gas by performing a heat exchange between the received air and the received natural gas, pass the heated natural gas to the pressure difference power generation facility, and pass cooled air to the turbine of the gas turbine power generation facility; a cooling air inflow channel for guiding the cooed air passed through the fuel gas heater to the turbine of the gas turbine power generation facility; a first waste heat recovery heat exchange facility in which heat exchange occurs between the flue gas generated by the gas turbine power generation facility and the working fluid having passed through the LNG heat exchange facility and flowing along a first flow channel; a second waste heat recovery heat exchange facility in which heat exchange occurs between the flue gas generated by the gas turbine power generation facility and a merged stream of the working fluid having passed through the LNG heat exchange facility and flowing along a second flow channel and the working fluid passing through the first waste heat recovery heat exchange facility, the working fluid passing through the second waste heat recovery heat exchange facility being supplied to the supercritical fluid power generation facility; and an air heat exchanger in which heat exchange occurs between the working fluid passing through the LNG heat exchange facility and the cooled air flowing along the cooling air inflow channel, the air heat exchanger having an outlet for passing the working fluid having passed through the LNG heat exchange facility and then through the air heat exchanger; and a transport pipe for transporting supercritical fluid, the transport pipe having a first end connected to the outlet of the air heat exchanger and a second end disposed opposite the first end and connected to the first flow channel.

2. The combined power generation system according to claim 1, wherein the natural gas resulting from the regasification performed in the LNG heat exchange facility includes:
   a first portion that is supplied to the fuel gas heater; and
   a second portion that is separate from the first portion and is supplied to consumers.

3. The combined power generation system according to claim 1, further comprising:
   a working fluid heat exchanger in which heat exchange occurs between the working fluid having undergone heat exchange in the LNG heat exchange facility and the working fluid discharged from the supercritical fluid power generation facility.

4. The combined power generation system according to claim 3, further comprising:
   a working fluid flow control valve for regulating flow rates of streams of the working fluid flowing into the first flow channel and the second flow channel,
   wherein the working fluid heat exchanger is disposed along the second flow channel between the working fluid flow control valve and the second waste heat recovery heat exchange facility, and
   wherein the working fluid passing through the LNG heat exchange facility and then through the air heat exchanger is supplied to the second flow channel between the working fluid heat exchanger and the second waste heat recovery heat exchange facility.

5. The combined power generation system according to claim 1, further comprising:
   a branch channel that connects the air discharge channel with the cooling air inflow channel to allow the portion of the compressed air produced by the compressor of the gas turbine power generation facility to bypass the fuel gas heater; and a cooling fan installed on the cooling air inflow channel and disposed closer to the turbine of the gas turbine power generation facility than a junction point of the cooling air inflow channel and the branch channel, wherein the air heat exchanger is installed on the cooling air inflow channel downstream from the cooling fan.

\* \* \* \* \*